United States Patent
Cousin et al.

(10) Patent No.: US 12,045,556 B2
(45) Date of Patent: Jul. 23, 2024

(54) DOCUMENT LAYOUT MANAGEMENT

(71) Applicant: MyScript, Nantes (FR)

(72) Inventors: Gregory Cousin, Nantes (FR); Baptiste Demarest, Nantes (FR)

(73) Assignee: MyScript, Nantes (FR)

( * ) Notice: Subject to any disclaimer, the term of this patent is extended or adjusted under 35 U.S.C. 154(b) by 0 days.

(21) Appl. No.: 17/793,187

(22) PCT Filed: May 18, 2020

(86) PCT No.: PCT/IB2020/000484
§ 371 (c)(1),
(2) Date: Jul. 15, 2022

(87) PCT Pub. No.: WO2021/144604
PCT Pub. Date: Jul. 22, 2021

(65) Prior Publication Data
US 2023/0055467 A1    Feb. 23, 2023

(30) Foreign Application Priority Data
Jan. 17, 2020 (EP) .................................... 20305041

(51) Int. Cl.
*G06F 40/106* (2020.01)
*G06F 3/04883* (2022.01)
(Continued)

(52) U.S. Cl.
CPC ........ *G06F 40/106* (2020.01); *G06F 3/04883* (2013.01); *G06F 40/14* (2020.01); *G06F 40/16* (2020.01); *G06F 2203/04808* (2013.01)

(58) Field of Classification Search
CPC .... G06F 40/106; G06F 3/04883; G06F 40/14; G06F 40/166; G06F 2203/04808
See application file for complete search history.

(56) References Cited

U.S. PATENT DOCUMENTS 11,194,442 B1 * 12/2021 Boyers .................. G06F 3/0482
2002/0059350 A1 * 5/2002 Iwema ................ G06F 3/03545
715/234
(Continued)

OTHER PUBLICATIONS

RO/EP: International Search Report mailed on Jul. 22, 2021 for corresponding International Application No. PCT/IB2020/000484; 4 pgs.
(Continued)

*Primary Examiner* — Keith D Bloomquist
(74) *Attorney, Agent, or Firm* — McDermott Will & Emery LLP

(57) ABSTRACT

The invention relates to methods and devices for managing document layout of an electronic document. In a particular embodiment, a method implemented by a computing devices comprises: displaying in an electronic document a block containing at least one item; in response to a first finger gesture of two or more fingers defining at least two selection points, determining a space line specifying an initial position from which a space is to be managed in the electronic document; in response to a second finger gesture of two or more fingers defining a movement of the selected points along a first orientation, monitoring a current position of the space line moving over time; and performing a space management based on the current position of the space line along the first orientation, comprising creating and/or reducing a space in the electronic document.

8 Claims, 29 Drawing Sheets

(51) Int. Cl.
*G06F 40/14* (2020.01)
*G06F 40/16* (2020.01)

(56) References Cited

U.S. PATENT DOCUMENTS

| | | | | |
|---|---|---|---|---|
| 2003/0212958 | A1* | 11/2003 | Altman | G06F 40/103 |
| | | | | 715/256 |
| 2009/0125848 | A1* | 5/2009 | Keohane | G06F 3/04883 |
| | | | | 715/863 |
| 2014/0101577 | A1* | 4/2014 | Kwak | G06F 3/1431 |
| | | | | 715/761 |
| 2015/0309976 | A1 | 10/2015 | Bai et al. | |
| 2017/0031591 | A1* | 2/2017 | Lee | G06F 3/04883 |
| 2017/0329756 | A1 | 11/2017 | Lee et al. | |
| 2018/0088784 | A1* | 3/2018 | Zhu | G06F 3/0486 |

OTHER PUBLICATIONS

RO/EP: Written Opinion mailed on Jul. 22, 2021 for corresponding International Application No. PCT/IB2020/000484; 11 pgs.

* cited by examiner

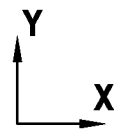

20

IT10 — In botany, a tree is a perennial plant with an elongated stem, or trunk, supporting branches and leaves in most species. In some usages, the definition of a tree may be narrower, including only woody plants with secondary growth, plants that are usable as lumber or plants above a specified height. In wider definitions, the taller palms, tree ferns, bananas, and bamboos are also trees.

IT11 — Trees are not a taxonomic group but include a variety of plant species that have independently evolved a trunk and branches as a way to tower above other plants to compete for sunlight. Trees tend to be long-lived, some reaching several thousand years old. Trees have been in existence for 370 million years. It is estimated that there are just over 3 trillion mature trees in the world.

FIG.6A

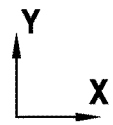

20

IT10 In botany, a tree is a perennial plant with an elongated stem, or trunk, supporting branches and leaves in most species. In some usages, the definition of a tree may be narrower, including only woody plants with secondary growth, plants that are usable as lumber or plants above a specified height. In wider definitions, the taller palms, tree ferns, bananas, and bamboos are also trees.

SH1, PT1, PT2, ⇐PS1

IT11 Trees are not a taxonomic group but include a variety of plant species that have independently evolved a trunk and branches as a way to tower above other plants to compete for sunlight. Trees tend to be long-lived, some reaching several thousand years old. Trees have been in existence for 370 million years. It is estimated that there are just over 3 trillion mature trees in the world.

IT10 — In botany, a tree is a perennial plant with an elongated stem, or trunk, supporting branches and leaves in most species. In some usages, the definition of a tree may be narrower, including only woody plants with secondary growth, plants that are usable as lumber or plants above a specified height. In wider definitions, the taller palms, tree ferns, bananas, and bamboos are also trees.

SP1

IT11 — Trees are not a taxonomic group but include a variety of plant species that have independently evolved a trunk and branches as a way to tower above other plants to compete for sunlight. Trees tend to be long-lived, some reaching several thousand years old. Trees have been in existence for 370 million years. It is estimated that there are just over 3 trillion mature trees in the world.

FIG.6D

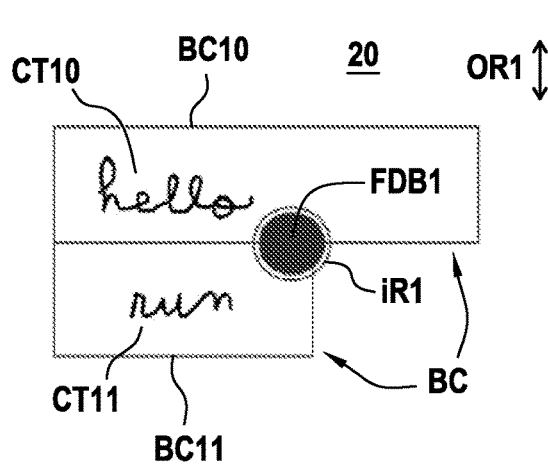
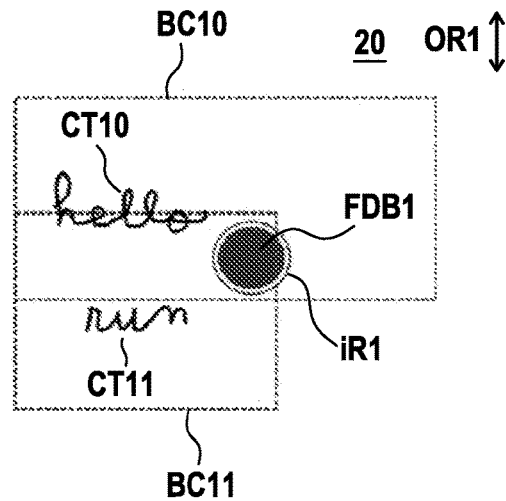
FIG.11A  FIG.11B
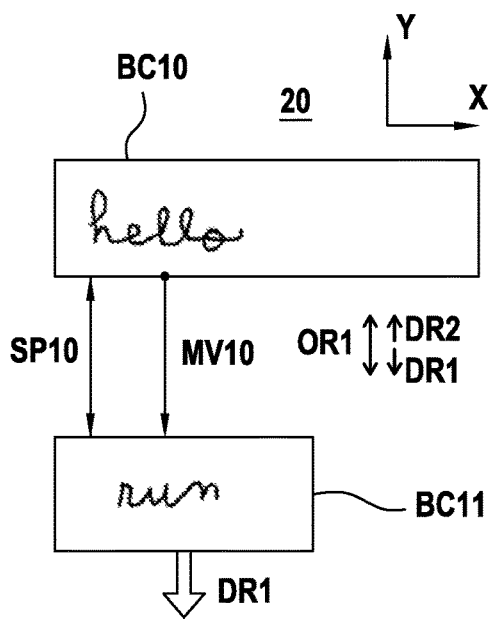
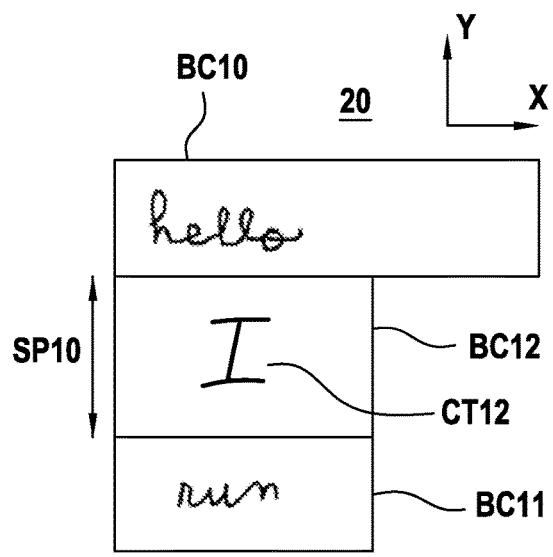
FIG.11C  FIG.11D

BC30
Y
X
OR1 ↕ ↓DR1

BC

En mathématiques et plus précisément en
algèbre, la théorie de Galois est l'étude
des extensions de corps commutatifs, par
le biais d'une correspondance avec des
groupes de transformations sur ces
extensions, les groupes de Galois. Cette
méthode féconde, qui constitue l'exemple
historique, a essaimé dans bien d'autres
branches des mathématiques, avec par
exemple la théorie de Galois différentielle,
ou la théorie de Galois des revêtements.

Cette théorie est née de l'étude par
Évariste Galois des équations algébriques.
L'analyse de permutations des racines
permet d'expliciter une condition
nécessaire et suffisante de résolubilité par
radicaux. Ce résultat est connu sous le
nom de théorème d'Abel-Ruffini.

En mathématiques et plus précisément en
algèbre, la théorie de Galois est l'étude
des extensions de corps commutatifs, par
le biais d'une correspondance avec des
groupes de transformations sur ces
extensions, les groupes de Galois. Cette
méthode féconde, qui constitue l'exemple
historique, a essaimé dans bien d'autres
branches des mathématiques, avec par
exemple la théorie de Galois différentielle,
ou la théorie de Galois des revêtements.
Les applications sont très variées. Elles
s'étendent de la résolution de vieilles
conjectures comme la détermination des
polygones constructibles à la règle et au
compas démontrée par le théorème de
Gauss-Wantzel à la géométrie algébrique à
travers, par exemple, le théorème des
zéros de Hilbert.

MV34
BC34
20
FDB34
FDB36
iR30
BC32
BC

FIG.13A

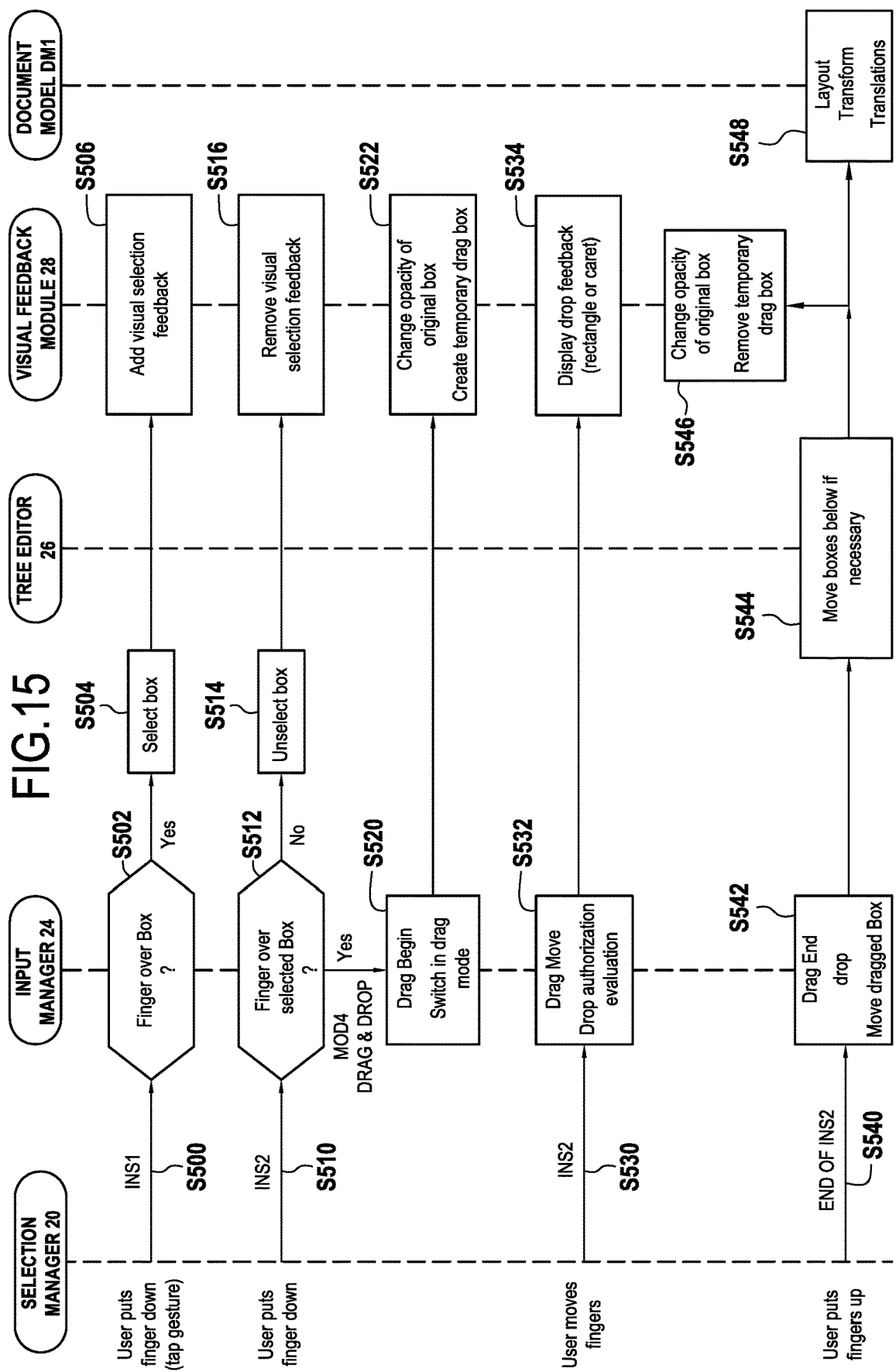

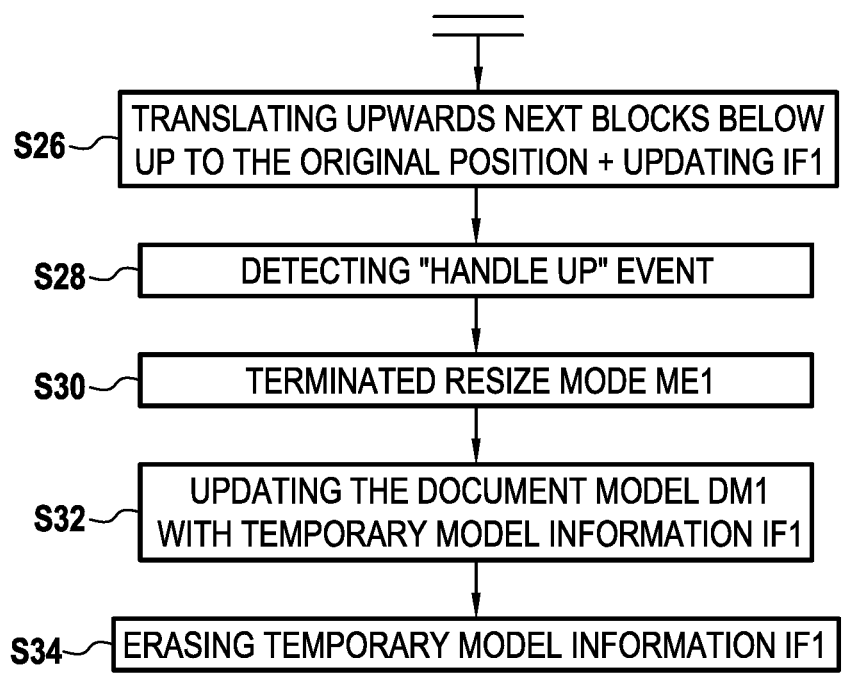
FIG.17(Bis)

20

BC1: After the medieval period, the word elf tended to become less common throughout the Germanic languages, losing out to alternative native terms like Zwerg ("dwarf") in German and huldra ("hidden being") in Scandinavian languages, and to loan-words like fairy (borrowed from French into most of the Germanic languages). Still, beliefs in elves persisted in the early modern period, particularly in Scotland and Scandinavia, where elves were thought of as magically powerful people living, usually invisibly, alongside everyday human communities. They continued to be associated with causing illnesses and with sexual threats. For example, a number of early modern ballads in the British Isles and Scandinavia, originating in the medieval period, describe elves attempting to seduce or abduct human characters. — CT1

SP1

BC2: With urbanisation and industrialisation in the nineteenth and twentieth centuries, beliefs in elves declined rapidly (though Iceland has some claim to continued popular belief in elves). However, from the early modern period onwards, elves started to be prominent in the literature and art of educated elites. These literary elves were imagined as small, impish beings, with William Shakespeare's A Midsummer Night's Dream being a key development of this idea. In the eighteenth century, German Romanticist writers were influenced by this notion of the elf, and reimported the English word elf into the German language. — CT2

FIG.19A

DOCUMENT LAYOUT MANAGEMENT

CROSS-REFERENCE TO RELATED APPLICATIONS

This application is a U.S. National Phase application under 35 U.S.C. § 371 of International Application No. PCT/IB2020/000484, filed on May 18, 2020; which claims the benefit of priority to European Application No. 20305041.4, filed Jan. 17, 2020; both of which are incorporated herein by reference in their entirety for all purposes.

TECHNICAL FIELD

The present disclosure relates generally to the field of computing device interface capable of acquiring, displaying and managing various user inputs such as text content and non-text content (graphics, etc.). In particular, the present disclosure concerns computing devices and corresponding methods for managing the layout of items or blocks, such as text items, text blocks, non-text items and and/or non-text blocks.

BACKGROUND

Computing devices continue to become more ubiquitous to daily life. They may take various forms such as computer desktops, laptops, tablet PCs, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Each type of computing device is equipped with particular computing resources and destined for given uses. Computing devices generally comprise of at least one processing element, such as a central processing unit (CPU), some form of memory, and input and output devices. The variety of computing devices and their subsequent uses necessitate a variety of input devices and interfaces to allow users to interact with their computing devices.

One such input device is a touch sensitive surface such as a touchscreen or touchpad wherein the user input is received through contact between a user body part (e.g. a finger) or an instrument (e.g. a pen or stylus), and the touch sensitive surface. Another input device is an input surface that senses gestures made by a user above the input surface. A further input device is a position detection system which detects the relative position of either touch or non-touch interactions with a non-touch physical or virtual surface.

Handwriting recognition can be implemented in computing devices to input and process various types of graphical objects (also called input elements), hand-drawn or handwritten by a user, such as text content (e.g., alphanumeric characters) or non-text content (e.g. shapes, drawings). Once inputted on a computing device, the input elements are usually displayed as digital ink and undergo handwriting recognition to be converted into typeset versions. The user handwriting input is typically interpreted using a real-time handwriting recognition system or method. To this end, either on-line systems (recognition carried out using a cloud-based solution or the like) or off-line systems may be used.

The user input may be drawings, diagrams or any other content of text, non-text or mixed content of text and non-text. Handwriting input may be made on a structured document according to guiding lines (base lines) which guide and constraint input by the user. Alternatively, a user may handwrite in free-mode, i.e. without any constraints of lines to follow or input size to comply with (e.g. on a blank page).

A computing device may thus acquire and display content, either text content and/or non-text content. The content may be in handwritten form and/or in typeset form. This content may be displayed in the forms of items (text items and/or non-text items) or blocks of one or more items (text blocks, non-text blocks, blocks of mixed text/non-text content) arranged according to a given layout in an electronic document. Once items and/or blocks are displayed in an electronic document, a user may wish to adapt the layout for instance to improve the visual rendering or to perform some editing.

Conventionally, applications are however limited in their capabilities to handle editing of electronic document layout, thereby limiting the user experience. In particular, it is generally difficult for users to rearrange the item layout and block layout in an electronic document, for instance to resize or reflow some content of interest, thus preventing easy editing of text and non-text content. For instance, computing devices running handwriting recognition applications generally do not permit easy and intuitive layout editing of content blocks.

In particular, there is no efficient and user-friendly solution allowing users to manage space in an electronic document or to perform item positioning functions such as copy & paste or drag & drop, so that an electronic document's layout is easily adapted with a limited number of commands or manipulations from the user. There is for instance a need for a better solution for controlling spaces between items or within blocks in an electronic document.

Overall, improvements are thus desired to allow easy and efficient management of an electronic document's layout on a computing device.

SUMMARY OF THE INVENTION

The examples of the present invention that are described herein below provide computing devices, methods and corresponding computer programs for managing a document layout (or a block layout), according to a first aspect, a second aspect and a third aspect of the invention.

According to a first aspect, the invention provides a method implemented by a computing device for managing a document layout, comprising the following steps:
  a1) displaying in an electronic document at least one block containing at least one text or non-text item;
  a2) in response to a first finger gesture of two or more fingers defining at least two selection points in the electronic document, determining a space line specifying an initial position from which a space is to be managed in said electronic document;
  a3) in response to a second finger gesture of two or more fingers defining a movement of said at least two selected points along a first orientation, monitoring a current position of the space line moving over time; and
  a4) performing a space management in the electronic document based on the current position of the space line along the first orientation, said space management comprising at least one of:

creating a space extending from the original position to the current position of the space line; and reducing an existing space by removing therefrom a portion extending from the original position to the current position of the space line.

By interacting with two or more fingers, a user can efficiently manage space within an electronic document. The user is enabled to manage the space (in or outside a block) in an easy, friendly and efficient manner by controlling the position of the space line along the first orientation. By moving the space line along the first orientation, the user may create a new space, expand it as much as necessary, and possibly reduce it (consume space) to adjust the size of the created space. The user may also manage an existing space which was already present within the electronic document prior to initiating the space management, for instance to reduce or consume the existing space (possibly up to the total removal of that space) or to expand it.

The invention may allow breaking the continuum of the electronic document by causing translation of items within a block. The computing device may adapt the document layout by moving a selection of one or more items so as to accommodate a growing space within the electronic document. Further, the block may be expanded (resized) if necessary by moving a border thereof to accommodate a growing space within the block. Intuitive and efficient document layout can thus be achieved.

In a particular embodiment, said space management performed in step a4) comprises:
 if the original position of the space line is positioned within one block, a space is created or reduced within said block so that said block is respectively expanded or contracted along the first orientation; and
 if the space line is positioned between at least two text or non-text items, a space is created or reduced so that said at least two items respectively part from each other or move closer to each other along said first orientation.

In a particular embodiment, the space management comprises:
 if the original position of the space line is positioned between two consecutive, first and second, items in the first orientation, the first item is maintained at the same position and the second item is moved along the first orientation to create or reduce a space while maintaining the block layout of the second item with any subsequent item present along the first orientation.

In a particular embodiment, said method further comprises displaying a space handle as a visual feedback representing the position of the space line over time in response to the first and second finger gestures.

In a particular embodiment, the at least two selection points detected in the determining step a2) are determined as defining said space line only if they are positioned substantially horizontally relative to each other.

In a particular embodiment, the computing device comprises:
 a screen displaying said electronic document;
 a selection manager receiving said first and second finger gestures performed with the screen; and
 an input manager controlling, based on the first and second finger gestures, a tree editor to perform said steps a2) to a4).

In a particular embodiment, the first orientation is the vertical orientation.

In a particular embodiment, the computing device comprises a visual feedback module, wherein if it is detected in step a2) that said at least two selection points are positioned within a block, the method comprises:
 selecting, by the input manager, said block as a current block;
 determining, by the input manager, a vertical position range within which the space line can be moved within said current block, said vertical position range being limited by the top and bottom border of said current block;
 selecting, by the input manager, each item positioned below the initial position within the current block;
 displaying, by the visual feedback module, a space handle as a visual feedback representing the position of the space line over time in response to the first and second finger gestures along with a visual feedback of each selected item;
 performing, by said input manager, said space management in step a4) such that:
  if the space line is moved downwards, creating a space extending from the original position to the current position of the space line while translating downwards each selected item; and
  if the space line is moved upwards, reducing an existing space by removing therefrom a portion extending from the original position to the current position of the space line while translating upwards each selected item.

In a particular embodiment, said space management in step a4) comprises:
 expanding the current block if any of said each selected item reaches the bottom border of the current block by translating downwards the bottom border of the current block from an original position to a new position;
 contracting the current block if, after expanding the current block, each selected item is moved back above the original position of the bottom border of the current block.

In a particular embodiment, if it is detected in step a2) that said at least two selection points are not positioned within a block, the method comprises:
 moving, by the input manager, the space line in the vertical orientation as a function of the second finger gesture, without limit in the downward direction; and
 displaying, by the visual feedback module, a space handle as a visual feedback representing the position of the space line over time in response to the first and second finger gestures, wherein the space handle is moved incrementally according to a pattern of discrete vertical positions in response to the movement defined by the second finger gesture.

In a particular embodiment, upon detecting an end of the second finger gesture, the method further comprises:
 removing the visual feedback of the space handle; and
 updating a document model of the electronic document to reflect the item layout achieved as a result of the space management.

In a particular embodiment of the first aspect, the various steps of the method are specified by computer program instructions.

Accordingly, the invention according to the first aspect also provides a computer program on a recording medium, this computer program being arranged to be implemented by a computing device, and more generally by a processor, this computer program comprising instructions adapted for the implementation of a method according to the first aspect as defined in the present disclosure.

The first aspect of the invention also provides a non-transitory recording medium readable by a computing device, or more generally by a processor, this recording medium comprising computer program instructions as mentioned above.

According to the first aspect, the invention also provides a computing device configured to implement the method of the first aspect as defined in the present disclosure. More specifically, the invention also concerns a computing device for managing block layout, comprising:

- a displaying module configured to display in an electronic document at least one block containing at least one text or non-text item;
- a determining module configured to, in response to a first finger gesture of two or more fingers defining at least two selection points in the electronic document, determine a space line specifying an initial position from which a space is to be managed between items in said electronic document;
- a monitoring module configured to, in response to a second finger gesture of two or more fingers defining a movement of said at least two selected points along a first orientation, monitor a current position of the space line moving over time; and
- a space management module configured to perform a space management in the electronic document based on the current position of the space line along the first orientation, said space management comprising at least one of:
  - creating a space extending from the original position to the current position of the space line; and
  - reducing an existing space by removing therefrom a portion extending from the original position to the current position of the space line.

The various embodiments defined in the present disclosure in connection with the method of the first aspect of present invention apply in an analogous manner to the computing device, the computer program and the non-transitory computer readable medium of the first aspect of the invention.

For each step of the method of the present invention as defined in the first aspect of the present disclosure, the computing device may comprise a corresponding module configured to perform said step.

According to a second aspect, the invention provides a method implemented by a computing device for managing block layout, comprising the following steps:

- b1) displaying in an electronic document at least two neighbour blocks contiguous to each other, said at least two neighbour blocks containing text or non-text content;
- b2) detecting, based on a first user instruction, user selection from said electronic document or from another electronic document of a current block which is to be positioned between said at least two neighbour blocks;
- b3) determining, based on a second user instruction, a user-selected insertion region specifying where the current block is to be positioned, said insertion region overlapping with said at least two neighbour blocks;
- b4) rearranging the block layout of said electronic document by moving at least one of said at least two neighbour blocks to create in said insertion region a space sufficiently large to accommodate the current block between said at least two neighbour blocks; and
- b5) positioning the current block according to the insertion region by pasting or dropping the current block within the created space.

The invention allows efficient, user-friendly and auto-adaptive insertion of a selected block by pasting or dropping the selected block in a space created between at least two contiguous blocks. It obviates the need for a user to embark into fastidious and inaccurate manipulations of the blocks of an electronic document. The user is not required to manually arrange a space between contiguous blocks before commanding insertion by pasting or dropping at least one selected block at a location between the blocks. Instead of manually moving the contiguous blocks to accommodate the required room in-between, the computing device may automatically adapt the document layout by moving the neighbour blocks relative to each other, and in response to a second user instruction commanding insertion by pasting or dropping a selected block in an insertion region overlapping the two or more neighbour blocks. Dynamic and intelligent adaptation of the document layout can be made by adjusting the size of the created space as a function of the size of the current block which is to be pasted.

In a particular embodiment, in said displaying step b1), the at least two neighbour blocks comprise a first block and a second block positioned contiguously to each other along a first orientation, wherein said rearranging step b4) comprises moving the second block by translation along the first orientation in a first direction from the first block towards the second block while maintaining the first block at the same position, thereby creating said space.

In a particular embodiment, during said rearranging step b4), the second block is moved by translation along with at least one other neighbour block subsequent to the second block in the first direction while maintaining the block layout of the second block and said at least one other neighbour block relative to each other.

In a particular embodiment, the first user instructions is a user instruction to copy the current block; and wherein the second user instruction is a user instruction to paste the current block at a pasting position defined by said insertion region.

In a particular embodiment, the second user instruction is a tap or press command defining the insertion region indicative of where the current block is to be pasted.

In a particular embodiment, said the first user instruction is a user instruction to drag the current block into the electronic document; and wherein the second instruction is a user instruction to drop the current block in said insertion region.

In a particular embodiment, the current block being dragged is part of a group of blocks contiguous to each other in a group orientation, the method comprising:

upon detecting that said current block is being dragged within the electronic document, moving at least one other block of said group subsequent to said current block in the group orientation, while maintaining the block layout of said at least one other block relative to each other, to remove the space left by the current block in the block layout of said group of blocks.

In a particular embodiment, the method further comprises:

monitoring, based on the first user instruction received over a continuous period of time, a drag movement of the current block within the electronic document; and displaying a first visual feedback representative of the drag movement over time of the current block being dragged in the electronic document and a second visual feedback representative of a drop position within the insertion region where the current block is to be positioned.

In a particular embodiment, the first visual feedback comprises a visual representation of the current block displayed with a changed opacity with respect to the current block as displayed prior to the drag movement, and wherein the second visual feedback comprises a graphic indicator which is displayed such that it moves at interfaces between pairs of neighbour blocks while the current block is being dragged.

In a particular embodiment, said computing device comprises:

a screen displaying said electronic document;

a selection manager receiving said first and second user instructions as user gestures performed with the screen; and an input manager controlling, based on the first and second user instructions, a tree editor to perform said steps b2) to b5).

In a particular embodiment, the input manager:

detects a user gesture performed in a selection region in the electronic document;

determines whether the selection region is overlapping at least partially two neighbour blocks within the electronic document; and if the selection region is overlapping at least partially two neighbour blocks within the electronic document, treats in said determining step b3) the selection region as said user-selected insertion region specifying where the current block is to be positioned.

In a particular embodiment of the second aspect, the various steps of the method are specified by computer program instructions.

Accordingly, the invention according to the second aspect also provides a computer program on a recording medium, this computer program being arranged to be implemented by a computing device, and more generally by a processor, this computer program comprising instructions adapted for the implementation of a method according to the second aspect as defined in the present disclosure.

The second aspect of the invention also provides a non-transitory recording medium readable by a computing device, or more generally by a processor, this recording medium comprising computer program instructions as mentioned above.

According to the second aspect, the invention also provides a computing device configured to implement the method of the second aspect as defined in the present disclosure. More specifically, the invention also concerns a computing device for managing block layout, comprising:

a displaying module for displaying in an electronic document at least two neighbour blocks contiguous to each other, said at least two neighbour blocks containing text or non-text content;

a detection module for detecting, based on a first user instruction, user selection from said electronic document or from another electronic document of a current block which is to be positioned between said at least two neighbour blocks;

a determining module for determining, based on a second user instruction, a user-selected insertion region specifying where the current block is to be positioned, said insertion region overlapping with said at least two neighbour blocks;

a control module for rearranging the block layout of said electronic document by moving at least one of said at least two neighbour blocks to create in said insertion region a space sufficiently large to accommodate the current block between said at least two neighbour blocks; and a positioning module for positioning the current block according to the insertion region by pasting or dropping the current block within the created space.

The various embodiments defined in the present disclosure in connection with the method of the second aspect of present invention apply in an analogous manner to the computing device, the computer program and the non-transitory computer readable medium of the second aspect of the invention.

For each step of the method of the present invention as defined in the second aspect of the present disclosure, the computing device may comprise a corresponding module configured to perform said step.

According to a third aspect, the invention provides a method implemented by a computing device for managing block layout, comprising:

displaying in an electronic document at least two blocks containing text or non-text content, said at least two blocks comprising a current block with at least one block handle and a first neighbour block subsequent to said current block in a first resizing orientation, each block being initially arranged at an original position in said electronic document;

in response to detecting selection of a block handle of the current block, storing the original position of the current block in temporary model information;

in response to detecting movement of the selected block handle according to a first handle orientation, resizing as first resizing the current block by increasing said current block in the first resizing orientation while adapting a block layout of said electronic document, wherein said adapting comprises:

reducing an empty space between the current block and the first neighbour block at their original positions as long as said empty space is not fully removed; and if there is no empty space between the current block and the first neighbour block at their original positions or if said empty space has been fully removed, moving the first neighbour block in the first resizing orientation along with any other neighbour block subsequent to the first neighbour block in the first resizing orientation.

In a particular embodiment, the method further comprises:

if the selected block handle is moved back in a second handle orientation opposite to said first handle orientation, resizing as second resizing the current block by decreasing said current block in a second resizing orientation opposite to said first resizing orientation while re-adapting the block layout of said electronic document, wherein said re-adapting comprises:

moving back in the second resizing orientation the first neighbour block along with said any other neighbour block until their respective original positions are reached, based on the temporary model information.

In a particular embodiment, the method further comprises:

in response to detecting a deselection of the block handle:

updating a document model of the electronic document based on the respective position of the current block and each neighbour block upon said deselection; and erasing the temporary model information.

In a particular embodiment, the method further comprises storing the original position of each moved block before said moving the first neighbour block in the first resizing orientation along with any other neighbour block subsequent to the first neighbour block in the first resizing orientation.

In a particular embodiment, during said adapting the block layout, if there is no empty space between the current block and the first neighbour block, said first neighbour block is moved along with at least one other neighbour block subsequent to the first neighbour block in the first resizing orientation while maintaining the block layout of the first neighbour block and of said at least one other neighbour block relative to each other.

In a particular embodiment, the first handle orientation and the first resizing orientation are the same, and wherein the second handle orientation and the second resizing orientation are the same.

In a particular embodiment, the first resizing orientation is downwards and the second resizing orientation is upwards in the electronic document.

In a particular embodiment, if the current block contains text, said text is reflowed in response to said first resizing and said second resizing.

In a particular embodiment of the third aspect, the various steps of the method are specified by computer program instructions.

Accordingly, the invention according to the third aspect also provides a computer program on a recording medium, this computer program being arranged to be implemented by a computing device, and more generally by a processor, this computer program comprising instructions adapted for the implementation of a method according to the third aspect as defined in the present disclosure.

The third aspect of the invention also provides a non-transitory recording medium readable by a computing device, or more generally by a processor, this recording medium comprising computer program instructions as mentioned above.

In a particular embodiment, the invention relates to a non-transitory computer readable medium having a computer readable program code embodied therein, said computer readable program code being adapted to be executed to implement a method for managing block layout according to the third aspect as defined in the present disclosure, the computing device comprising a processor for executing the steps of said method.

The present invention also relates to a computing device configured to implement the method as defined in accordance with the third aspect of the present disclosure. More particularly, the present invention provides a computing device for managing block layout, comprising:
a displaying module configured to display in an electronic document at least two blocks containing text or non-text content, said at least two blocks comprising a current block with at least one block handle and a first neighbour block subsequent to said current block in a first resizing orientation, each block being initially arranged at an original position in said electronic document;
a storing module configured to, in response to detecting selection of a block handle of the current block, store the original position of the current block in temporary model information;
a layout management module configured to, in response to detecting movement of the selected block handle according to a first handle orientation, resize as first resizing the current block by increasing said current block in the first resizing orientation while adapting a block layout of said electronic document, wherein said adapting comprises:
reducing an empty space between the current block and the first neighbour block at their original positions as long as said empty space is not fully removed; and
if there is no empty space between the current block and the first neighbour block at their original positions or if said empty space has been fully removed, moving the first neighbour block in the first resizing orientation along with any other neighbour block subsequent to the first neighbour block in the first resizing orientation.

The various embodiments defined above in connection with the method of the third aspect of present invention apply in an analogous manner to the computing device, the computer program and the non-transitory computer readable medium of the present disclosure.

For each step of the method of the present invention as defined in the third aspect of the present disclosure, the computing device may comprise a corresponding module configured to perform said step.

In a particular embodiment, the block layout management module is configured to, if the selected block handle is moved back in a second handle orientation opposite to said first handle orientation, resize as second resizing the current block by decreasing said current block in a second resizing orientation opposite to said first resizing orientation while re-adapting the block layout of said electronic document, wherein said re-adapting comprises:
moving back the first neighbour block in the second resizing orientation along with said any other neighbour block until their respective original positions are reached, based on the temporary model information.

In a particular embodiment, the computing device further comprises a model management module configured to, in response to detecting a deselection of the current block, update a document model of the electronic document based on the respective position of the current block and each neighbour block upon said deselection,
wherein the storing module is configured to, in response to said update of the document model, erase the temporary model information.

Where functional modules are referred to in the present disclosure for carrying out various steps of the described methods, it will be understood that these modules may be implemented in hardware, in software, or a combination of the two. When implemented in hardware, the modules may be implemented as one or more hardware modules, such as one or more application specific integrated circuits. When implemented in software, the modules may be implemented as one or more computer programs that are executed on one or more processors.

In the present disclosure, the computer programs according to the various aspects of the invention can be expressed in any programming language, and can be in the form of source code, object code, or any intermediary code between source code and object code, such that in a partially-compiled form, for instance, or in any other appropriate form.

The non-transitory computer readable medium previously mentioned in relation to the various aspects of the invention can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

The non-transitory computer readable medium of the invention can correspond to a transmittable medium, such as an electrical or an optical signal, which can be conveyed via an electric or an optic cable, or by radio or any other appropriate means. The computer program according to the disclosure can in particular be downloaded from the Internet or a network of the like.

Alternatively, the non-transitory computer readable medium can correspond to an integrated circuit in which a computer program is loaded, the circuit being adapted to execute or to be used in the execution of the methods of the invention.

BRIEF DESCRIPTION OF THE DRAWINGS

Other characteristics and advantages of the present disclosure will appear from the following description made with reference to the accompanying drawings which show embodiments having no limiting character. In the figures:

FIGS. 6A, 6B, 6C and 6D depict different steps of a method of the first aspect of the invention, according to a particular embodiment;

FIGS. 11A, 11B, 11C and 11D depict different steps of a method of the second aspect of the invention, according to a particular embodiment;

FIGS. 13A and 13B depict different steps of a method of the second aspect of the invention, according to a particular embodiment;

FIG. 15 is a flow chart illustrating the steps of a method of the second aspect of the invention, according to a particular embodiment;

FIGS. 19A, 19B and 19C depict different steps of a method of the third aspect of the invention, according to a particular embodiment.

Figure 1:
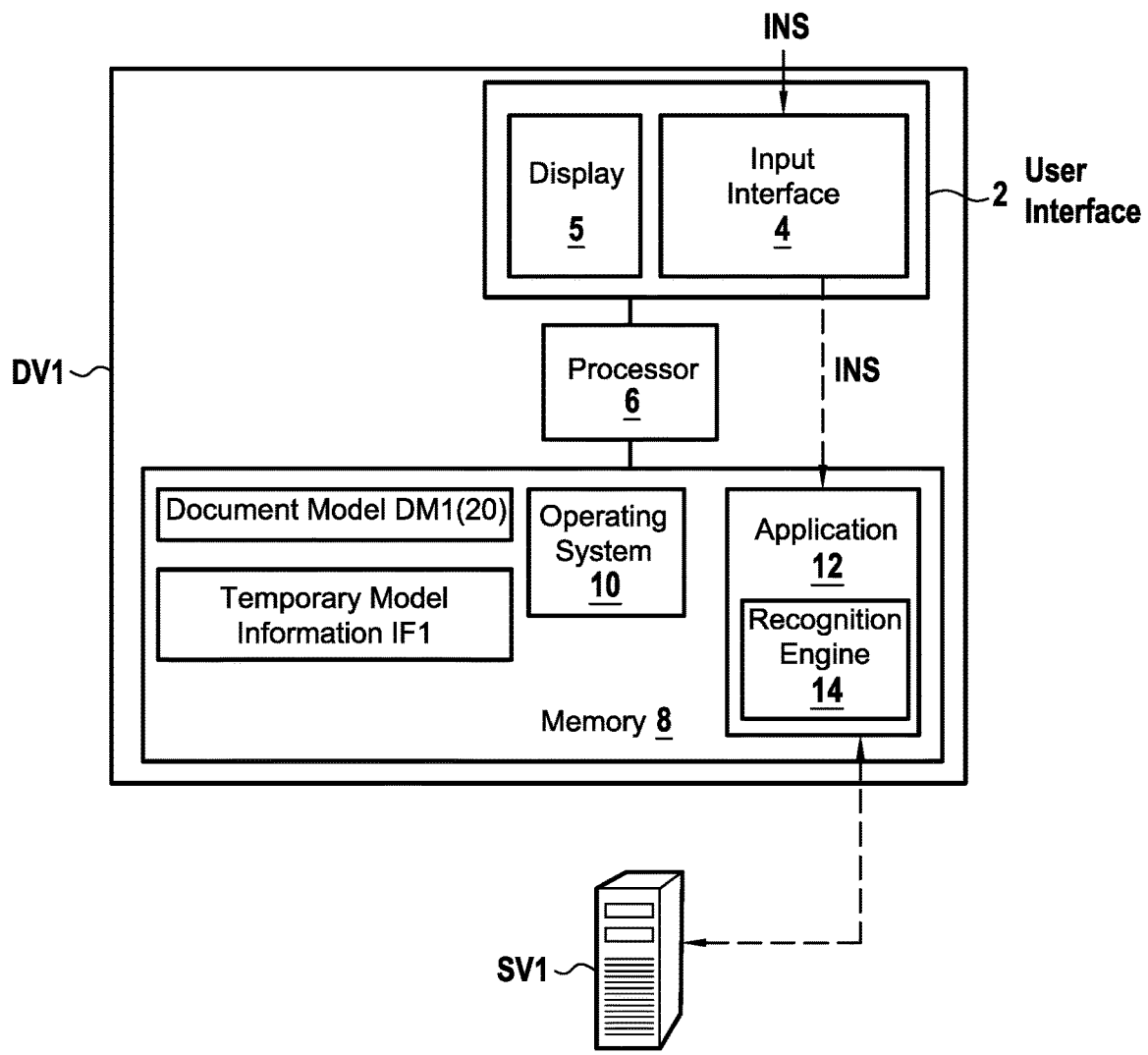
FIG. 1 is a block diagram of a computing device according to a particular embodiment of the present invention.

The components in the figures are not necessarily to scale, emphasis instead being placed upon illustrating the principles of the present invention.

For simplicity and clarity of illustration, the same reference signs will be used throughout the figures to refer to the same or analogous parts, unless indicated otherwise.

DESCRIPTION OF PARTICULAR
EMBODIMENTS OF THE INVENTION

In the following detailed description, numerous specific details are set forth by way of examples in order to provide a thorough understanding of the relevant teachings. However, it should be apparent to those skilled in the art that the present teachings may be practiced without such details. In other instances, well known method, procedures, and/or components are described at a relatively high-level, without detail, in order to avoid unnecessarily obscuring aspects of the present teachings.

The following description of the exemplary embodiments refers to the accompanying drawings. The following detailed description does not limit the invention. Instead, the scope of the invention is defined by the appended claims. In various embodiments as illustrated in the figures, a computing device, a corresponding method and a corresponding computer program are discussed.

The terms "hand-drawing" and "handwriting" are used interchangeably herein to define the creating of digital contents (handwriting input) by users through use of their hands (or fingers) or an input device (hand-held stylus or digital pen, mouse . . . ) on or with an input surface.

The term "hand", "finger" or the like is used herein to provide concise description of the input techniques, however the use of other parts of a user's body for similar input is included in this definition, such as foot, mouth and eye.

Handwriting is formed by strokes of digital ink input by a user. A stroke (or input stroke) is characterised by at least a stroke initiation location (corresponding to a "pen down" event), a stroke terminal location (corresponding to a "pen up" event), and the path connecting the stroke initiation and the stroke terminal locations.

The term "text" in the present disclosure is understood as encompassing all characters (e.g. alphanumeric characters or the like), and strings thereof, in any written language and, more generally, any symbols used in written text. Text thus includes base characters and accents from any script, such as Latin scripts, Cyrillic scripts, Chinese scripts, and so on.

The term "non-text" in the present description is understood as encompassing freeform handwritten or hand-drawn content (e.g. shapes, drawings, etc.) and image data, as well as characters, and string thereof, or symbols which are used in non-text contexts. Non-text content defines graphic or geometric formations in linear or non-linear configurations, including containers, drawings, common shapes (e.g. arrows, blocks, etc.) or the like. In diagrams for instance, text content may be contained in a shape (a rectangle, ellipse, oval shape . . . ) called containers.

Furthermore, the examples shown in these drawings are in a left-to-right written language context, and therefore any reference to positions can be adapted for written languages having different directional formats.

The various technologies described herein generally relate to managing the layout of text and non-text content in an electronic document. Such a management may be performed on portable and non-portable computing devices, more particularly on computing devices implementing a handwriting processing application.

As described in more details below, an aspect of the present invention concerns managing the layout of an electronic document, i.e. the layout of items and/or blocks (or boxes) of various contents, including text and/or non-text. Various aspects of the invention are described further below. The invention allows an efficient management of the layout of electronic documents, for instance to manage spaces in electronic documents, to perform copy & paste or drag & drop functions, to edit the block layout, etc.

FIG. 1 shows a block diagram of a computing device DV1 according to a particular embodiment of the present invention. The computing device (or digital device) DV1 may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device DV1 may include components of at least one processing elements, some form of memory and input and output (I/O) devices. The components communicate with each other through inputs and outputs, such as connectors, lines, buses, links networks, or others known to the skilled person.

More specifically, the computing device DV1 comprises a user interface (UI) for enabling a user to interact with the computing device DV1. The user interface 2 comprises an input interface 4 for inputting content, such as text and/or non-text content. The user interface 2 may comprise any suitable means (mouse, input surface, controller, key, pen etc.) for allowing a user to provide user instructions INS (commands) for implementing a method in accordance with various embodiments of the present invention. The input interface 4 may be adapted to input text and non-text content in any appropriate form, such as in handwritten form and/or in typeset form.

In a particular, the input interface 4 may comprise an input surface for handwriting (or hand-drawing) content. The input surface is suitable to detect a plurality of strokes of digital ink entered on (or using) said input surface. The input surface 4 may employ any appropriate technology such as resistive, surface acoustic wave, capacitive, infrared grid, infrared acrylic projection, optical imaging, dispersive signal technology, acoustic pulse recognition, or any other appropriate technology as known to the skilled person to receive user input in the form of a touch- or proximity-sensitive surface. The input surface may be a non-touch sensitive surface which is monitored by a position detection system.

The user interface 2 may also comprise at least one display unit (or display device) 5 for outputting data from the computing device DV1. The display unit 5 may be a screen or the like of any appropriate technology (LCD, plasma . . . ). The display unit 5 is suitable to display text and non-text content as digital ink.

The input interface 4 may be co-located with the display unit 2 or remotely connected thereto. In a particular example, the display unit 5 and the input interface 4 are parts of a touchscreen.

As depicted in FIG. 1, the computing device DV1 further comprises a processor 6 and a non-volatile memory 8. The computing device DV1 may also comprise one or more volatile storing elements (RAM).

The processor 6 is a hardware device for executing software, particularly software stored in the memory 8. The processor 6 can be any custom made or general purpose processor, a central processing unit (CPU), a semiconductor based microprocessor (in the form of microchip or chipset), a microcontroller, a digital signal processor (DSP), an application specific integrated circuit (ASIC), field programmable gate array (FPGA) or other programmable logic device, or any combination thereof, and more generally any appropriate processor component designed for executing software instructions as known to the skilled person.

The memory 8 is a non-transitory (or non-volatile) computer readable medium (or recording medium) in accordance with a particular embodiment of the disclosure. The memory 8 may include any combination of non-volatile storing elements (e.g. ROM, EPROM, flash PROM, EEPROM, hard drive, magnetic or optical tape, memory registers, CD-ROM, WORM, DVD, or the like).

The memory 8 may be remote from the computing device DV1, such as at a server or cloud-based system, which is remotely accessible by the computing device DV1. The non-volatile memory 8 is coupled to the processor 6, so that the processor 6 is capable of reading information from and writing information to the memory 8. In the present example, the memory 8 is integral to the computing device DV1.

The memory 8 includes an operating system (OS) 10 and a content management application (or computer program) 12. The operating system 10 controls the execution of the application 12. This application constitutes (or comprises) a computer program (or computer-readable program code) according to various embodiments of the invention, this computer program comprising instructions to implement a method according to various embodiments of the invention.

As described below in relation to various aspects of the invention, the application 12 includes instructions for managing layout of content (text and/or non-text content) of an electronic document 20 which is acquired in any appropriate manner, for instance by means of the input interface 4 or via any other means. In the present example, content which is to be processed may comprise handwriting (formed of strokes of digital ink) and/or typeset content.

The application 12 may comprise a recognition engine 14 for performing handwriting recognition based on acquired handwritten content. Recognition of digital ink handwriting input using so-called online recognition techniques can be used. Other techniques of handwriting recognition may be also applied, such as offline recognition involving a remote device or server SV1 to perform handwriting recognition. The recognition engine 14 may execute any appropriate recognition algorithm to recognise handwriting, as well known to the skilled person. Implementations of the various aspects of the invention are however possible without performing an handwriting recognition. As for other features of the computing device DV1, the recognition engine 14 is thus not mandatory.

As depicted in FIG. 1, the non-volatile memory 8 is suitable to store various data acquired by the computing device DV1, including a document model DM1 and temporary model information IF1.

The document model DM1 comprises information defining an electronic document 20 containing a plurality of blocks (or boxes) of text and/or non-text content (see further below). In particular, the document model DM1 defines the layout according to which these blocks are arranged within the electronic document 20.

First Aspect of the Invention

A first aspect of the present invention is described herebelow in reference with FIGS. 1-8. According to this first aspect, the invention allows efficient and user-friendly management of space in an electronic document.

It is now considered that the computing device DV1 as shown in FIG. 1 is configured to implement the first aspect of the invention, according to a particular embodiment.

Figure 2:
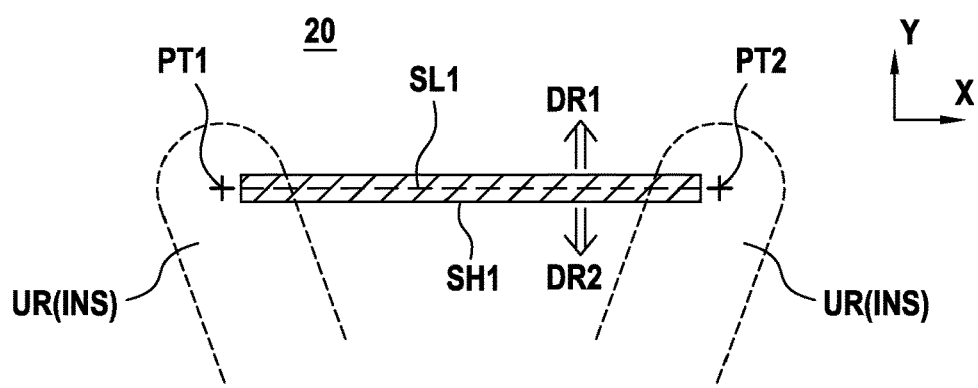
FIG. 2 is illustrating the concept of the first aspect of the invention, according to a particular embodiment.

FIG. 2 illustrates the principle of the first aspect of the invention, according to a particular embodiment. In an electronic document 20 containing one or more items (text and/or non-items), a user UR may wish to edit the layout of the electronic document 20 by modifying the way the one or more items are arranged or positioned. In particular, situations may arise where the user UR wishes to create, expand, reduce and/or delete a space in the electronic document 20. To this end, the user may provide instructions INS to the computing device DV1 for the application 12 to control and edit the document layout, in particular to perform space management in the electronic document 20.

As shown in FIG. 2, a user may perform a first finger gesture INS1 to define at least two selection points PT1 and PT2 in an electronic document 20 displayed on the display 5 of the computing device DV1. To this end, the user UR may position at least two fingers on (or next to) the input surface 4 to designate at least two corresponding selection points PT1, PT2 within the electronic document 20. Based on this first finger gesture INS, the computing device DV1 determines a space line SL1 specifying an initial position from which a space is to be managed in the electronic document 20. In particular, the user UR may perform a second finger gesture INS2 by moving his fingers relative to the input surface 4 in order to move the space line SL1, thereby causing the computing device DV1 to perform a space management based on the position of the space line SL1. As shown in FIG. 2, a graphic indicator SH1, called hereafter a space handle, may be displayed as a visual feedback to represent the position of the space line 1 over time.

As described in more details below, the space management instructed by the user by means of the second finger gesture may comprise creating a new space and/or reducing an existing space. In particular, the space management may comprise creating a space extending from the original position to the current position of the space line SL1 and/or reducing (or consuming) an existing space by removing therefrom a portion extending from the original position to the current position of the space line SL1.

According to various embodiments of the first aspect, the invention thus provides a method implemented by the computing device DV1 for managing a document layout, comprising the following steps:

displaying in an electronic document at least one block containing at least one text or non-text item;

in response to a first finger gesture of two or more fingers defining at least two selection points in the electronic document, determining a space line specifying an initial position from which a space is to be managed in said electronic document;

in response to a second finger gesture of two or more fingers defining a movement of said at least two selected points along a first orientation, monitoring a current position of the space line moving over time; and performing a space management in the electronic document based on the current position of the space line along the first orientation.

This space management may comprise any one of (or both of):

creating a space extending from the original position to the current position of the space line; and reducing an existing space by removing therefrom a portion extending from the original position to the current position of the space line.

Figure 3:
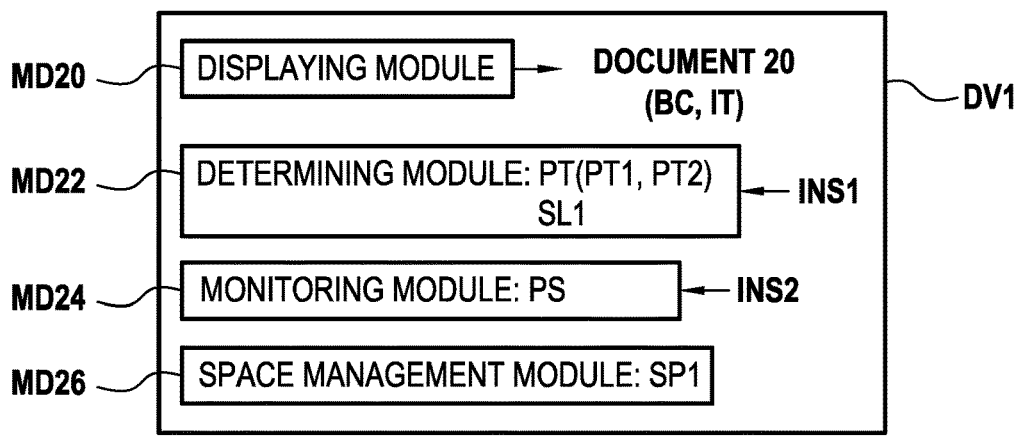
FIG. 3 is a block diagram representing functional modules implemented by a computing device of the first aspect of the invention, according to a particular embodiment.

As shown in FIG. 3 according to a particular embodiment, when running the application 12 stored in the memory 8 (FIG. 1), the processor 6 implements modules, namely: a displaying module MD20, a determining module MD22, a monitoring module MD24 and a space management module MD26.

More specifically, the displaying module MD20 may be configured to display in an electronic document 20 at least one block BC containing at least one text or non-text item IT.

The determining module MD22 may be configured to, in response to a first finger gesture INS1 of two or more fingers defining at least two selection points PT in the electronic document 20, determine a space line SL1 specifying an initial position PS from which a space is to be managed in the electronic document 20.

The monitoring module MD24 may be configured to, in response to a second finger gesture INS2 of two or more fingers defining a movement of said at least two selected points PT along a first orientation, monitor a current position PS of the space line SL1 which moves over time.

The space management module MD26 may be configured to perform a space management in the electronic document 20 based on the current position PS of the space line SL1 along the first orientation. As described further below, this space may be managed within a block or outside any block that may be present in the electronic document 20 (for instance between two or more items). This space management may comprise at least one of:

creating a space extending from the original position PS to the current position PS of the space line SL1; and reducing an existing space by removing therefrom a portion extending from the original position PS to the current position PS of the space line SL1.

The application 12 may comprise instructions configuring the processor 6 to implement the above-mentioned modules MD20-MD26 in order to perform steps of the method of the first aspect of the invention, as described below in particular embodiments.

The configuration and operation of the modules MD20-MD26 of the computing device DV1 will be more apparent in the particular embodiments described hereinbelow with reference to the figures. It is to be understood that the modules MD20-MD26 as shown in FIG. 2 represent only an example embodiment of the first aspect of the present invention, other implementations being possible.

For each step of the method of this first aspect, the computing device DV1 may comprise a corresponding module configured to perform said step.

A method of the first aspect of the invention, which is implemented by the computing device DV1 as shown in FIGS. 1 and 3, is now described with reference to FIGS. 4-8, in accordance with particular embodiments. More specifically, the computing device DV1 implements this method by executing the application 12 stored in the memory 8.

An example scenario is considered where the computing device DV1 acquires an electronic document 20 comprising text and/or non-text content in the form of items IT and blocks (or boxes) BC of one or more items IT. The configuration (form, content, arrangement etc.) of the items IT and blocks BC may vary depending on each case.

An item IT or a block BC may for instance extend through the full width of the electronic document 20. A full-width block may also be called a section (e.g. free-writing section). In a particular example, the electronic document 20 comprises at least one said section.

Figure 5A:
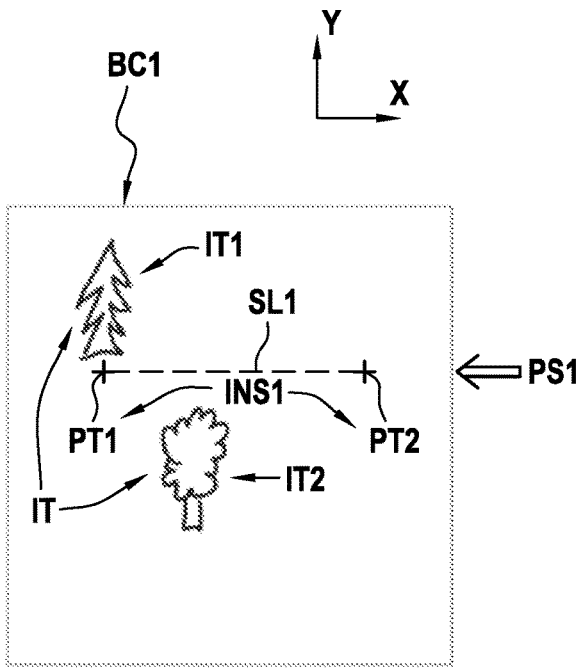
FIGS. 5A, 5B, 5C, 5D and 5E depict different steps of a method of the first aspect of the invention, according to a particular embodiment.

As shown in FIG. 5A, it is assumed in the present example that the electronic document 20 comprises a block BC1 containing two non-text items IT1 and IT2 which are drawings representing trees. The electronic document 20 also comprises two text items IT3 and IT4 in the vicinity of the block BC1. Other examples are possible where the document 20 does not contain any block BC, which means that each item IT is positioned in the document 20 without using any block to contain them.

In a displaying step S200 (FIG. 4), the computing device DV1 displays the electronic document 20 on the display unit 5, so that each item IT can thus be visualised by a user. Each item IT and the block BC1 are initially arranged at an original position in the electronic document 20, according to an original document layout. The present method allows managing a space within the block BC1 or outside the block BC1, for instance between the items IT3 and IT4.

In a detecting step S202 (FIG. 4), the computing device DV1 detects a first finger gesture INS1 of two or more fingers defining at least two selection points PT in the electronic document 20. It the present example, it is assumed that the computing device DV1 detects (S202) a first finger gesture INS1 of two fingers defining two selection points PT1, PT2 in the electronic document 20. This first finger gesture INS1 is performed by a user using the input surface 4. The user places for instance two fingers on (or next to) the input surface 4 to designate the two selection points PT1 and PT2 in the electronic document 20 on display.

In this example, the selection points PT1, PT2 are positioned within the block BC1, although other examples are possible where the selection points PT are positioned outside any block BC.

In response to this first finger gesture INS1, the computing device DV1 determines (S204) a space line SL1 specifying an initial position PS1 from which a space is to be managed in the electronic document 20. In this example, the space line SL1 intersects both selection points PT1, PT2, although other techniques of line calculation are possible, for instance if more than two selection points PT are defined by the first finger gesture INS1 (e.g. line interpolation). The computing device DV1 may store the original position PS1 for later use during the process.

In this example, the space line SL1 is thus positioned within the block BC1. It is assumed that the space line SL1 is horizontal or substantially horizontal, although other implementations are possible where a space is managed based on a space line SL1 which extends along any appropriate orientation.

In a particular example, the at least two selection points PT detected in the determining step S204 are determined as defining a so-called space line SL1 only if these points PT are positioned substantially horizontally relative to each other (or substantially along any appropriate orientation).

Further, each item IT positioned within the block BC1 below the space line SL1 determined in S204 may be selected for the purpose of space management, as described further below. In the present case, it is assumed that the item IT2 is thus selected. A visual feedback may be displayed to indicate selection of this item IT2 (as shown in FIG. 5B).

Figure 5B:
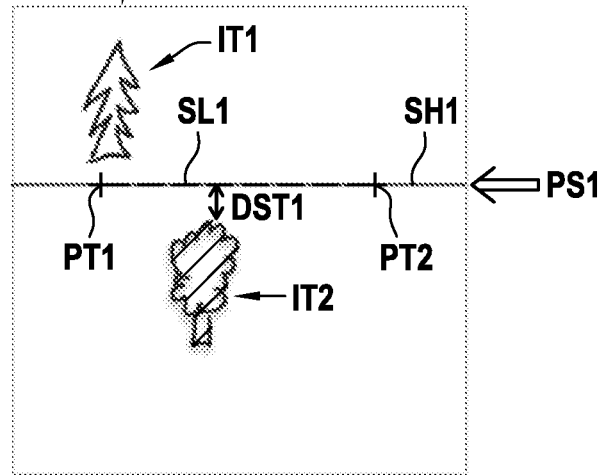

As shown in FIG. 5B, the computing device DV1 displays (S206) on the display unit 5 a space handle SH1 as a visual feedback of the space line SL1, once the latter has been determined in S204. Although it is not obligatory, this space handle SH1 assists the user in determining where and how the space line SL1 is positioned. The space handle SH1 may take any appropriate form and visual appearance to help the user to edit the document layout. In the present case, the space handle SH1 is a caret, i.e. a mark placed to indicate a proposed insertion in a document, or any other appropriate graphic indicator such as a rectangle or a line. This caret SH1 may be superimposed on the space line SL1 so that the user can instantly visualise the position and orientation of the space line SL1.

Figure 4:
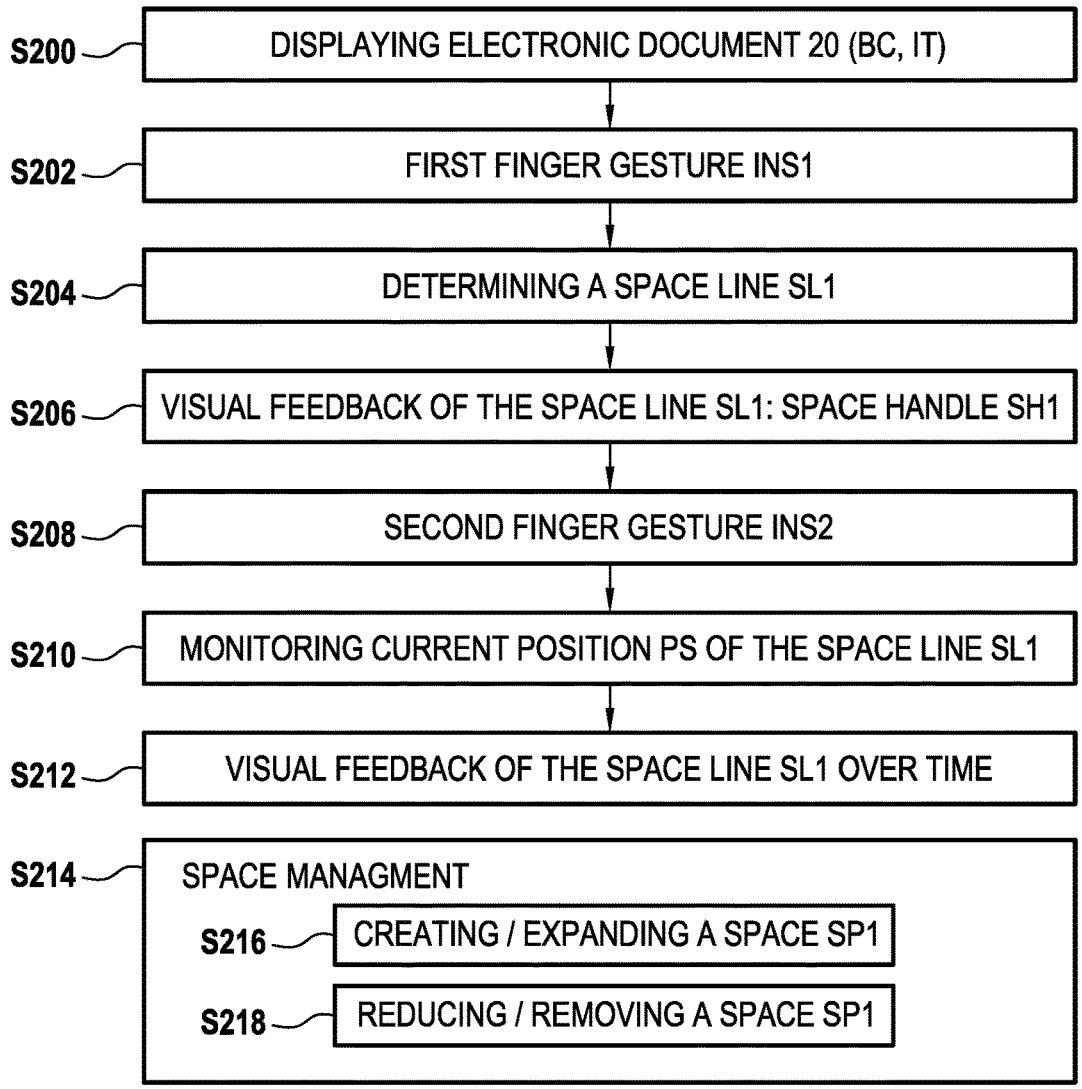
FIG. 4 is a flow chart illustrating the steps of a method of the first aspect of the invention, according to a particular embodiment.
Figure 5C:
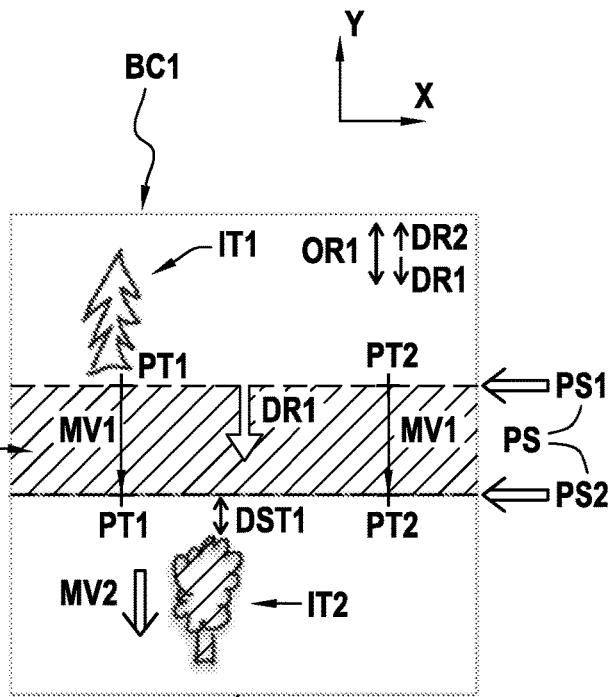

As shown in FIG. 5C, the computing device DV1 then detects (S208, FIG. 4) a second finger gesture INS2 of two fingers defining a movement MV1 of the two selected points PT1, PT2 along a first orientation OR1. This second finger gesture INS2 is performed by the user using the input surface 4. The user moves for instance his two fingers on (or next to) the input surface 4 to designate a movement MV1 of the two selection points PT1 and PT2 in the electronic document 20 on display.

In the present example, it is assumed that the first orientation OR1 along which the two selected points PT1, PT2 move is vertical, i.e. parallel to the direction y (FIG. 5C). More specifically, the user performs the second finger gesture INS2 to move the selection points PT1 and PT2 in a first direction DR1, i.e. downwards, along the orientation OR1. As described later, the computing device DV1 may however detects (S208) a movement MV1 of the two selected points PT1, PT2 in any of the two opposite directions DR1, DR2 along the first orientation OR1. In the present example, it is assumed that the directions DR1 and DR2 point respectively downwards and upwards. In a variant described later, the computing device DV1 may thus detect in S208 that the two selected points PT1, PT2 move together upwards.

Additionally, other orientations OR1 (and two opposite directions along this orientation) may however be considered. The orientation OR1 may for instance be horizontal instead of vertical for instance.

In response to the second finger gesture INS2, the computing device DV1 monitors (S210, FIG. 4) the current position PS of the space line SL1 over time, while the space line SL1 undergoes the movement MV1 under the user's control. FIG. 5C shows an example where the user moves his fingers to translate the selection points PT1, PT2 downwards (direction DR1), thereby shifting downwards the space line SL1 from its original position PS1 to a new position PS2 within the block BC1.

In a particular example, the computing detection DV1 detects that the space line SL1 moves along the orientation OR1 only if the two selected points PT1, PT2 are determined as moving along the same orientation OR1 with a predefined angle tolerance. Above a predefined angle deviation threshold, no movement of the space line SL1 is thus detected.

As shown in FIG. 5C, the computing device DV1 displays (S206) on the display unit 5 the space handle SH1 as a visual feedback representing the position of the space line SL1 over time in response to second finger gesture INS2. The user can thus visualise the space handle SH1 shifts from the original position PS1 to the new position PS2 further down in the block BC1 along the orientation OR1. As already indicated, this space handle SH1 is not obligatory but may assist the user in determining how the space line SL1 moves over time.

In the present example, the computing device DV1 controls movement of the selection points PT1, PT2 such that these points, and thus the space line SL1 defined by these points, may only move along the orientation OR1 in response to the second finger gesture INS2 received (S208) over time.

In a managing step S214 (FIG. 4), the computing device DV1 performs a space management in the electronic document 20 based on the current position of the space line SL1 along the first orientation OR1. In other words, space management is performed (S214) as a function of the position PS of the space line SL1 along the orientation OR1, taking as a reference the original position PS1.

More particularly, in response to the movement MV1 downwards (direction DR1 along the orientation OR1) of the space line SL1, the computing device DV1 creates (S216) a space SP1 within the block BC1. In this example, the space SP1 is formed between the items IT1 and IT2. As shown in FIG. 5C, this space SP1 extends from the original position PS1 to the current position PS2 of the space line SL1 along the orientation OR1. This space SP1 thus expands while the space line SL1 shifts downwards away from the original position PS1. By moving his fingers, the user may control the position of the space line SL1 and thus adapt the size of the created space SP1.

Further, any item IT positioned within the block BC1 below the original position PS1 of the space line SL1 is selected for the purpose of the space management performed in step S214. As indicated earlier, it is assumed in the present example that the item IT2 has been selected in step S204 for the purpose of space management, as shown by a corresponding visual feedback highlighting the item selection. The nature of the item selection may of course vary depending on each case. Further, other implementations are possible where the item selection concerns any item positioned above (instead of below) the space line SL1 for instance.

During the space management S214, the computing device DV1 moves (S216) the selected item IT2 below the space line SL1, along the first orientation OR1, in response to the movement MV1 of the selection points PT1, PT2 according to the second finger gesture INS2. The movement MV2 of the selected item IT2 reflects the movement MV1 of the space line SL1 with respect to its original position PS1. In the present example, the movements MV1 and MV2 are identical. As shown in the example of FIG. 5C, in response to the movement MV1 downwards of the space line SL1, the item IT2 is thus shifted (S216) downwards within the block BC1 to maintain the same distance DST1 between the item IT2 and the space line SL1 while the latter moves downwards.

Figure 5D:
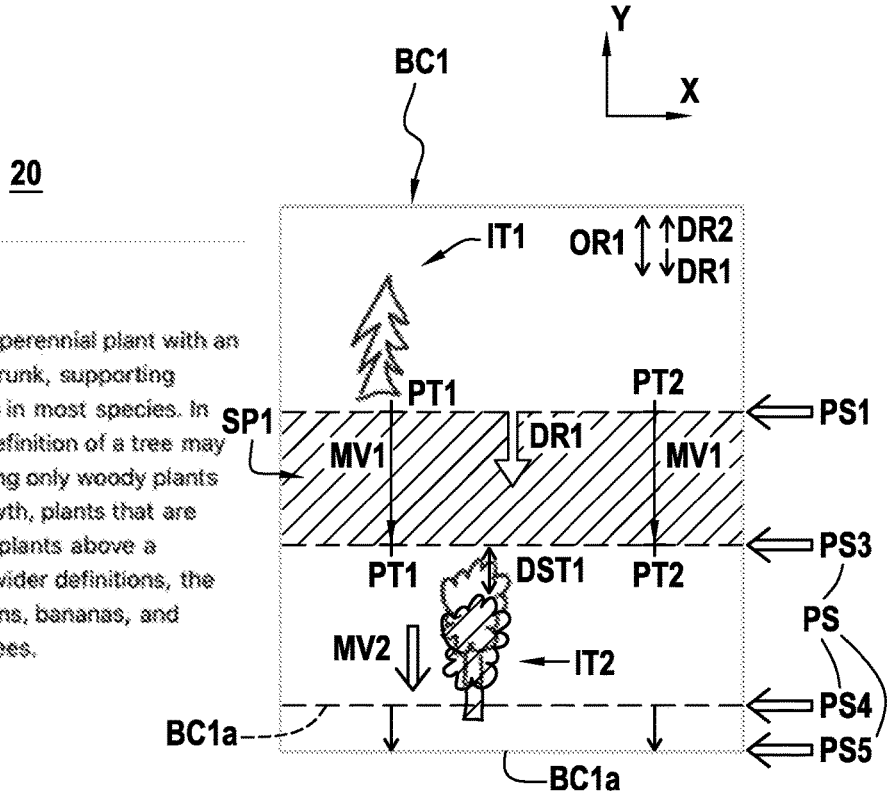

As shown in FIG. 5D, if the selected item IT2 reaches the bottom border BC1a of the block BC1 while the space SP1 is growing, the computing device DV1 also expands (S216) the block BC1 by shifting its bottom border BC1a downwards to accommodate the selected item IT2 as it moves downwards within the block BC1. The bottom border BC1a is thus moved by translation from its original position PS4 to a new position PS5 further downwards. The computing device DV1 also adapts (S216) if necessary the general document layout of the electronic document 20 to accommodate the growing size of the block BC1. To do so, the computing device DV1 may adapt the form and/or position of at least one item IT outside the block BC1 in the electronic document 20. In the present case, the text item IT4 is thus moved downwards to give room to the block BC1 undergoing space management.

Figure 5E:
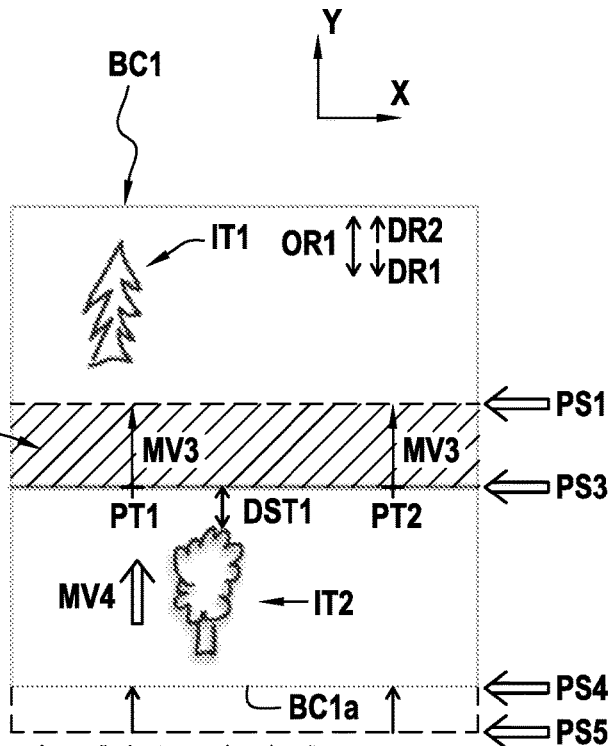

As shown in FIG. 5E, the user may also command the computing device DV1, still by means of the second finger gesture INS2, to revert back to the original layout of the electronic document 20 or to an intermediate layout between the original layout and the current layout. To this end, the user may pursue his second finger gesture INS2 by causing the selection points PT1, PT2 to shift back upwards (direction DR2) within the block BC1. In response to the space line SL1 moving back upwards towards its original position PS1, the computing device DV1 thus reduces or contracts (S218, FIG. 4) the existing space SP1 which is still defined by the gap between the original position PS1 and the current position PS of the space line SL1 along the first orientation OR1. The space SL1 may be reduced up to its total removal if the space line SL1 reaches back its original position PS1.

Additionally, while the space line SL1 is moved back upwards, the selected item IT2 is also moved back upwards (S218) so that the same distance DST1 between the space line SL1 and the selected item IT2 is maintained. The computing device DV1 also contracts (S218) the block BC1 by shifting its bottom border BC1 back upwards until reaching its original position PS4. Once the original size of the block BC1 is recovered, the bottom border BC1a of the block BC1 remains in its original position PS4 even if the space line SL1 keeps moving upwards.

By interacting with two or more fingers, a user can efficiently manage space within the electronic document 20.

More specifically, the user is thus enabled to manage the space SP1 in the block BC1 in an easy, friendly and efficient manner by controlling the position of the space line SL1 (represented by the space handle SH1) along the first orientation OR1. By moving the space line SL1 along the first orientation OR1, the user may create a new space SP1, expand it as much as necessary, and possibly reduce it (consume space) to adjust the size of the created space. The user may also manage an existing space which was already present within the electronic document prior to initiating the space management, for instance to reduce or consume the existing space (possibly up to the total removal of that space) or to expand it.

The invention allows breaking the continuum of the electronic document 20 by causing translation of items within a block. The computing device DV1 adapts the document layout by moving a selection of one or more items so as to accommodate a growing space within a block. Further, the block is expanded (resizing) if necessary by moving a border thereof to accommodate a growing space within the block. Intuitive and efficient document layout can thus be achieved.

It should be noted that the space management S214 performed by the computing device DV1 may also cause an existing space to be reduced, that is, a space which was already present before initiating the space management. More particularly, based on the current position PS of the space line SL1 along the first orientation OR1, the computing device DV1 may reduce an existing space by removing therefrom a portion extending from the original position to the current position of the space line SL1 along the first orientation OR1. For instance, assuming in FIG. 5C that the space line SL1 is moved upwards (instead of downwards), the computing device DV1 may reduce the space existing between the items IT1 and IT2 within the block BC1, thereby causing the selected item IT2 to shift upwards to maintain the same distance DST1 relative to the space line SL1. In this particular example, the form and size of the block BC1 remain unchanged while the existing space is being reduced. The contraction of this existing space may be stopped once the space line SL1 reaches the item IT1.

Once the user ends the second finger gesture INS2, the computing device DV1 removes the space handle SH1 from the display and the method ends. The document model DM1 may be updated based on the layout of the document (to include for instance the space SP1 created within the block BC1, the positions of the items within the block BC1, the form of the block BC1, etc.).

In the examples described above, space management is performed within a block BC1 of the electronic document 20. However, as already indicated, space management according to the first aspect of the invention may also be performed outside a block. A particular embodiment is now described with reference to FIGS. 6A-6D where a space is managed between two items IT, outside any block that may be present in the electronic document 20.

As shown in FIG. 6A, it is now considered an electronic document 20 comprising two items IT10 and IT11, namely text items in this example although other kinds of items are possible. It is assumed that a user uses his/her fingers to trigger space management between the items IT10 and IT11 within the electronic document 20 displayed by the computing device DV1. The computing device DV1 thus performs a method for managing document layout of the electronic document 20 in the same manner as in the steps S200-S218 (FIG. 4) described above.

In substance, the user performs a first finger gesture INS1 to define two selection points PT1, PT2 in the electronic document 20 between items IT10 and IT11. To this end, the user places two fingers on (or next to) the input surface 5. In response to this first finger gesture INS1 of two fingers, the computing device DV1 determines (S204) a space line SL1 specifying an initial position from which space is to be managed in the electronic document 20. As shown in FIG. 6B, a space handle SH1 may be displayed as a visual feedback of the space line SL1 to help the user in controlling the overall process.

Figure 6C:
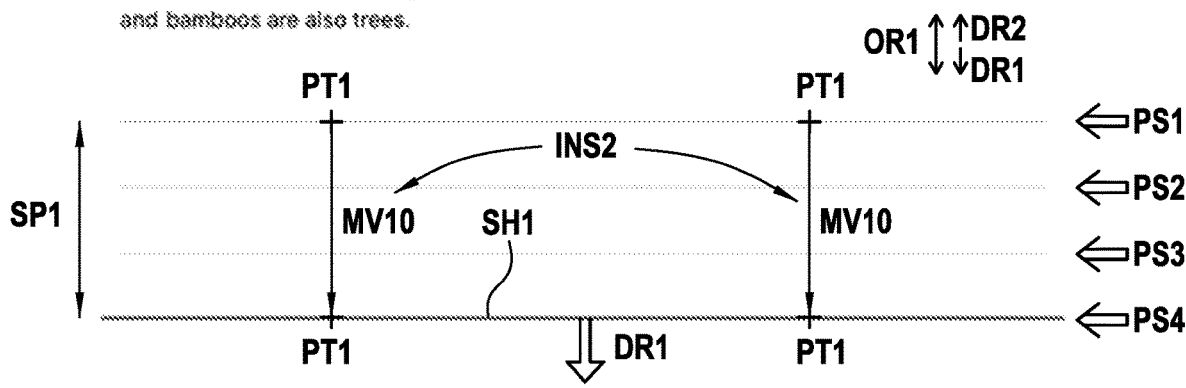

As shown in FIG. 6C, the user then performs a second finger gesture INS2 to define a movement of the two selected points PT1, PT2 along the first orientation OR1. In response to the second finger gesture INS2, the computing device DV1 monitors (S210) the current position of the space line SL1 as it moves over time in the downward direction (first direction DR1). The space handle SH1 is also displayed to provide a visual feedback while the space line SL1 drifts downwards.

As shown in FIG. 6C, the computing device DV1 thus performs space management (S214) by creating a space SP1 between the items IT10, IT11, based on the current position of the space line SL1 along the first orientation OR1. To accommodate the expanding space SP1, the computing device DV1 translates the selected item IT11 downwards within the electronic document 20. The movement MV11 downwards operated by the item IT11 is thus responsive to the movement MV10 of the space line SL1 (in this case, the movements MV10 and MV11 are identical).

As shown in FIG. 6D, once the user ends the second finger gesture INS2, the computing device DV1 removes the space handle SH1 from the display and the method ends. The document model DM1 may then be updated based on the layout of the document (to include the created space SP1 and the new position of the item IT11).

Figure 7:
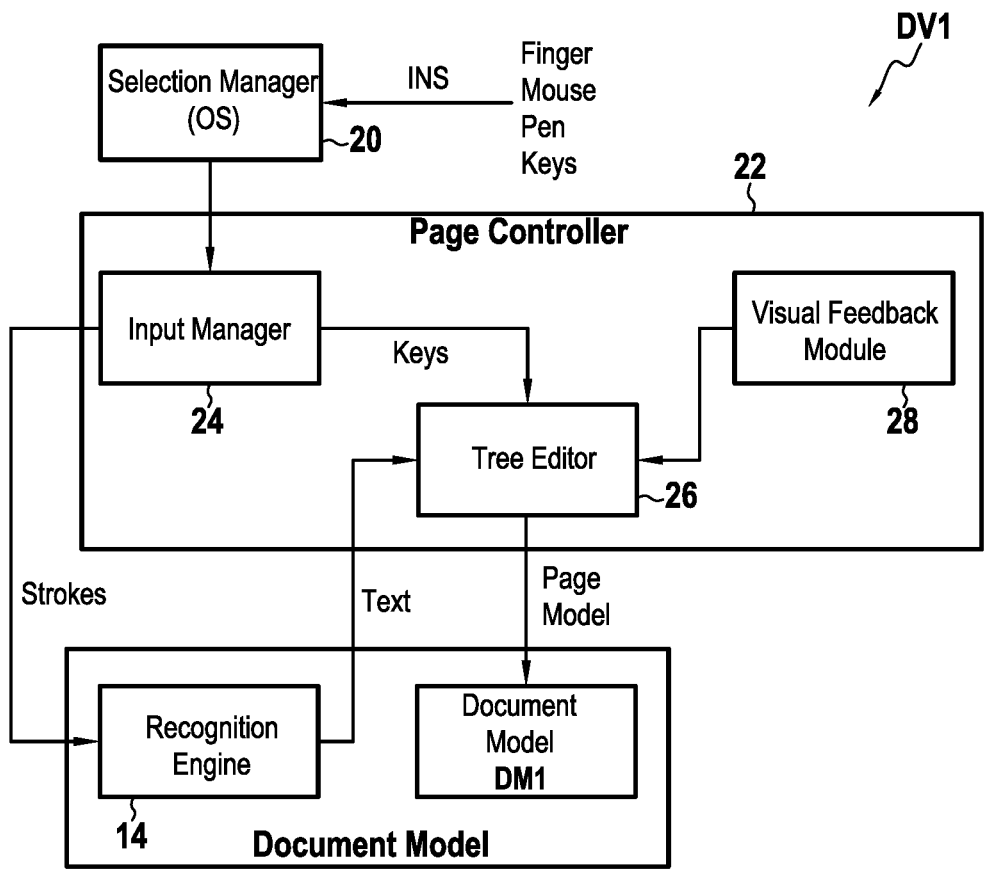
FIG. 7 is a block diagram of a computing device according to a particular embodiment of the present invention.

Still in relation with the first aspect of the invention, FIG. 7 shows the structure of the computing device DV1 according to a particular embodiment. In this case, the computing device DV1 comprises a selection manager 20 and a page controller 22, the latter comprising an input manager 24, a tree editor 26 and a visual feedback module 28

The selection manager 20, which may be implemented by the operating system OS 10 (FIG. 1), is configured to manage the user interactions input (user instructions INS) by means of the user interface 2. The selection manager 20 receives user instructions INS, such as user finger gestures or the like, and manages the display of the electronic document 20 on the display unit 5.

The page controller 22, which may be implemented by the application 12 (FIG. 1), is configured to implement a method accord to any one of the aspects of the present invention in response to user instructions INS. More specifically, the input manager 24 is configured to receive and interprets the user instructions INS transmitted by the selection manager 20. The input manager 24 is also configured to control the tree editor module 26. The tree editor module 26 is configured to manage the document layout of the electronic document 20 under the control of the input manager module 24. The tree editor 26 may also manage and update the document model DM1 comprising information representative of the layout of the electronic document 20. In a particular example, the input manager 24 and the tree editor 26 may form one and same module (called input manager 24) implemented by the application 12. The visual feedback module 28 is configured to manage visual feedback to be displayed on the display unit 5, to reflect the layout management performed by the input manager 2 and the tree editor 26.

In a particular example, the application 12 may also implement a recognition engine 14 as already indicated earlier, to perform handwriting recognition on strokes detected as input by the input manager.

The input manager 24 is for instance configured to carry out the steps S202-S218 as previously described with reference to FIG. 4.

Further description of these components is provided herebelow in particular embodiments.

A method of the first aspect of the invention, implemented by the computing device DV1 illustrated in FIGS. 1 and 7, is now described with reference to FIG. 8, in accordance with a particular embodiment. More specifically, the computing device DV1 implements this method by executing the application 12 stored in the memory 8 to manage the document layout of an electronic document 20 comprising one or more items (text and/or non-text items).

A first finger gesture INS1 of two fingers is detected by the selection manager 20 and transmitted (S300) to the input manager 24. In a set up step S302, the input manager 24 interprets the received first finger gesture INS1 (space management set up), in particular to locate the two selection points PT1, PT2 designated by the user in the electronic document 20.

In a determining step S304, the input manager 24 determines whether the two selection points PT1, PT2 chosen by the user are over (or in) a block BC of the electronic document 20. If the result of the determining step S304 is positive, the input manager 24 operates in a first mode MOD1 (space management within a target block) and the method proceeds with a storing step S306, otherwise the input manager 24 operates in a second mode MOD2 (space management outside a block) and the method proceeds with a storing step S310.

In the storing step S306, it has been detected that the two selected points PT1, PT2 are over a target block (or current block) BC and thus the input manager 24 stores the position, noted min Y and max Y, of respectively the bottom border and top border of the target block BC along the first orientation OR1 (e.g. the vertical orientation). The input manager 24 may determine a vertical position range (along orientation OR1) within which a space line SL1 can be moved within the target block BC, where the vertical position range is limited by the top and bottom border of the target block.

Once the storing step S306 is completed, the visual feedback module 28 triggers display (S308) of a space handle SH1 as a visual feedback of the space line SL1 defined by the two selection points PT1, PT2.

In the storing step S310, it has been detected that the two selected points PT are not over any block BC and thus the input manager 24 stores the position of the preceding item IT (min Y) and subsequent item IT (next block), along the first orientation OR1 (e.g. the vertical orientation), relative to the space line SL1 in the electronic document 20. The input manager 24 then determines (S312) the space line SL1 based on the selection points PT1, PT2 and the visual feedback module 28 triggers (S314) display of a space handle SH1 as a visual feedback of the space line SL1 defined by the two selection points PT1, PT2.

In a determining step S322, the input manager 24 then determines whether it operates in the first mode MOD1 or in the second mode MOD2. To this end, the input manager 24 may retrieve the result obtained in step S304. If the first mode MOD1 is implemented, the method proceeds with a step S326, otherwise (second mode MOD2) the method proceeds with a step S324.

In the step S324, the input manager 24 switches into a line pattern mode according to which the space handle SH1 is snapped into one of the positions defined by a line pattern. According to the line pattern mode, the space handle SH1 is only movable within the electronic document 20 according discrete separate line positions as defined by the line pattern. In a particular example, this line pattern mode is only activated if the space line SL1 is positioned between two non-contiguous items within the electronic document 20. The input manager 24 then causes creation (S303) of an instance of the tree editor 26.

In the step S326, the input manager 24 selects (S326) each item positioned below the initial position of the space line SL1 within the target block BC. Additionally, the visual feedback module 28 triggers (S328) display of a visual feedback, for instance by highlighting each selected item, to indicate on display the item selection within the target block BC.

Figure 8:
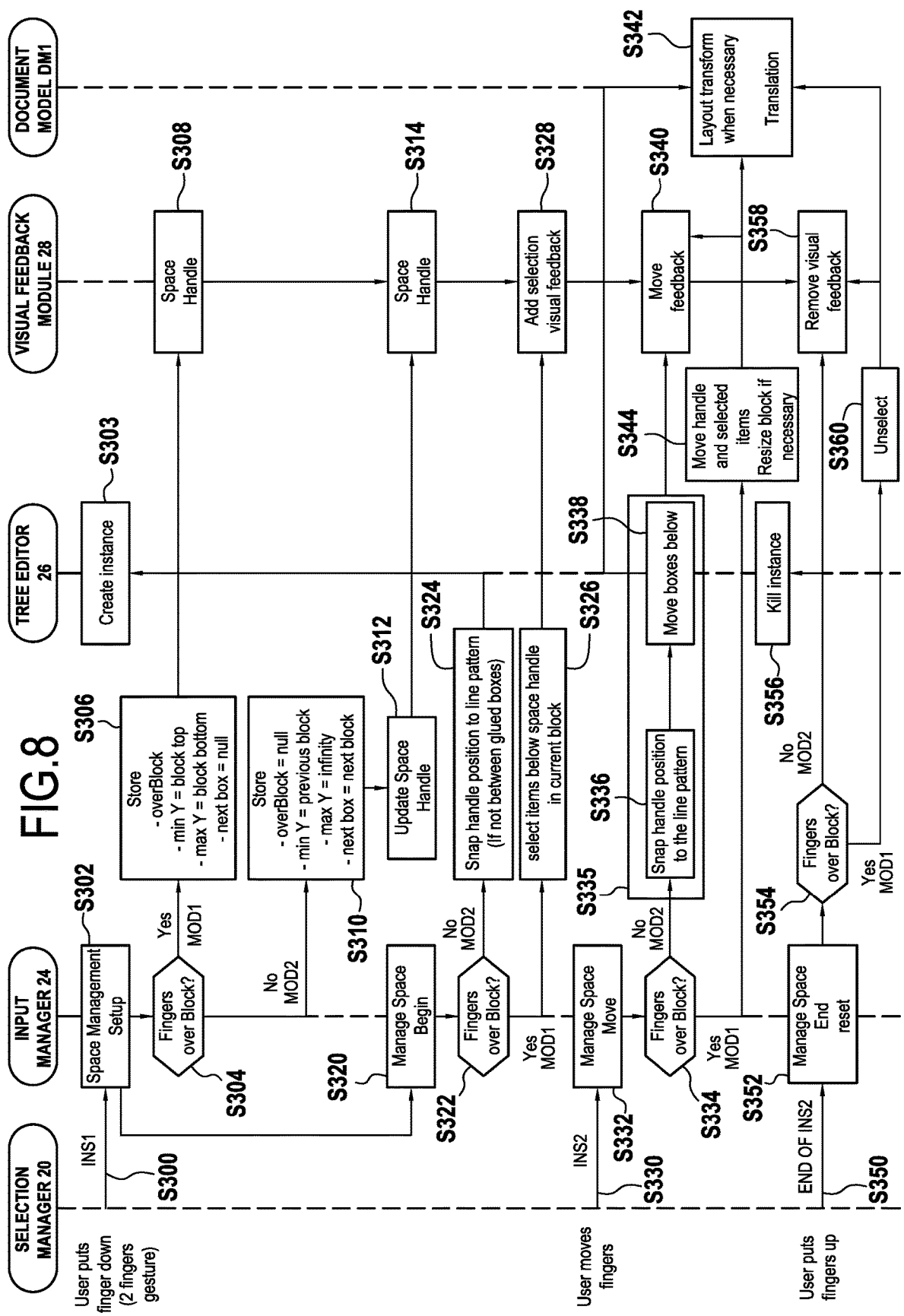
FIG. 8 is a flow chart illustrating the steps of a method of the first aspect of the invention, according to a particular embodiment.

As shown in FIG. 8, a second finger gesture INS2 of two fingers is then detected by the selection manager 20 and transmitted (S330) to the input manager 24. In response to the received second finger gesture INS2, the input manager 2 switches (S332) to a space management mode to manage space in the electronic document 20. In a determining step S334, the input manager 24 then determines whether it operates in the first mode MOD1 or in the second mode MOD2. To this end, the input manager 24 may retrieve the result obtained in step S304. If the first mode MOD1 is implemented, the method proceeds with a space management step S344, otherwise (second mode MOD2) the method proceeds with a space management step S335.

During the space management step S335, the input manager 24 executes steps S336 and S338 to manage space in the electronic document 20. In step S336, the input manager 24 moves the space line SL1 based on the second finger gesture INS2. In accordance with the line pattern mode, the space handle SH1 is displayed so that it is snapped (or moved) within the electronic document 20 according to discrete separate line positions as defined by the line pattern (by jumping from one predefined line position to a consecutive one). The space line SL1 and thus the space handle SH1 may be moved upwards and/or downwards within the electronic document 20. Further, in step S338, if the space line SL1 is moved downwards, any selected item below (e.g. blocks) is moved by the tree editor 26 to accommodate room for the growing space extending from the original position to the current position of the space line SL1.

Further, the visual feedback module 28 adapts (S340) the visual feedback on display by moving the space handle SH1 according to the line pattern (line pattern mode). Overall, the visual feedback module 28 may display the space handle SH1 as a visual feedback representing the position of the space line SL1 over time in response to the first and second finger gestures INS1, INS2, along with a visual feedback of each selected item IT below the space line SL1.

The tree editor 26 may also cause the document model DM1 to be updated (S342) to be representative of the changed document layout of the electronic document 20.

In the space management step S344 (first mode MOD1), the tree editor 26 moves, within the target block BC, the space lines SL1 and each item IT selected below the space line SL1, based on the second finger gesture INS2. The tree editor 26 resizes if necessary the target block BC to accommodate the created or expanded space SP1. Further, the visual feedback module 28 adapts (S340) the visual feedback on display by moving the space handle SH1 according to the line pattern. The tree editor 26 may also cause the document model DM1 to be updated (S342) to be representative of the changed document layout of the electronic document 20.

In a particular example, when operating in the first mode MOD1 (space management within a target block BC), the space management S344 performed by the input manager 24 is such that:

if the space line SL1 is moved downwards, a space SP1 extending from the original position PS1 to the current position of the space line SL1 is created while translating downwards each selected item IT positioned below the space line SL1; and if the space line SL1 is moved upwards, an existing space SP1 (i.e. a space present in the electronic document 20 before the space management) is reduced by removing therefrom a portion extending from the original position PS1 to the current position of the space line SL1 while translating upwards each selected item IT.

As indicated earlier, when operating in the first mode MOD1, the input manager 24 may also adapt (S344) the layout of the target block BC during the space management in response to the second finger gesture INS2. In a particular example, the space management comprises:

expanding the current block if any item selected in S326 reaches the bottom border of the current block BC, by translating downwards the bottom border of the current block from an original position to a new position;

contracting (reducing) the current block if, after expanding the current block, each selected item is moved back above the original position of the bottom border of the current block.

In a particular example, when operating in the second mode MOD2 (space management outside any block BC), the space management S335 performed by the input manager 24 comprises moving the space line SL1 in the vertical orientation OR1 as a function of the second finger gesture INS2, without limit in the downward direction DR1. Additionally, as indicated earlier, the visual feedback module 28 may display a space handle SH1 as a visual feedback representing the position of the space line SL1 over time in response to the first and second finger gestures INS1, INS2, wherein the space handle SH1 is moved incrementally according to a pattern of discrete vertical positions (e.g. the previously-mentioned line pattern) in response to the movement defined by the second finger gesture INS2.

It is then assumed that the user ends the second finger gesture, for instance by releasing the input surface 4. The end of the second finger gesture INS2 is then detected by the selection manager 20 and transmitted (S350) to the input manager 24. In response to the end of the second finger gesture INS2, the input manager 24 ends (S352) the space management mode.

In a determining step S354, the input manager 24 determines whether it operates in the first mode MOD1 or in the second mode MOD2. To this end, the input manager 24 may retrieve the result obtained in step S304. If the first mode MOD1 is implemented, the method proceeds with a step S358, otherwise (second mode MOD2) the method proceeds with steps S356 and S358.

In step S356, the input manager 24 terminates the instance of the tree editor 26. Further, in step S358, the visual feedback module 28 removes from display the space handle SH1 serving as the visual feedback of the space line SL1.

In step S360, the tree editor 26 unselects any item IT positioned below the space line SL1 within the target block BC and the visual feedback module 28 removes (S358) from display the space handle SH1 (visual feedback of the space line SL1) and the visual feedback of the item selection made in S326.

By interacting with two or more fingers, a user can efficiently manage space within the electronic document 20.

More specifically, the user is thus enabled to manage the space SP1 between two items IT in an easy, friendly and efficient manner by controlling the position of the space line SL1 (represented by the space handle SH1) along the first orientation OR1. By moving the space line SL1 along the first orientation OR1, the user may create a new space SP1, expand it as much as necessary, and possibly reduce it (consume space) to adjust the size of the created space. The user may also manage an existing space present within an electronic document prior to initiating the space management, for instance to reduce or consume the existing space (possibly up to the total removal of that space) or to expand it.

The invention allows breaking the continuum of the electronic document 20 by causing translation of items (e.g. any selected items below the space line SL1). The computing device DV1 adapts the document layout by moving a selection of one or more items so as to accommodate a growing space within the electronic document 20.

In general terms, the space management S214 (FIG. 4) performed by the computing device DV1 may comprise the following:
 if the original position PS1 of the space line SL1 is positioned within one block BC, a space SP1 is created or reduced within said block so that said block is respectively expanded or contracted along the first orientation OR1; and
 if the space line SL1 is positioned between at least two text or non-text items IT (e.g. outside a block), a space SP1 is created or reduced so that said at least two blocks respectively part from each other or move closer to each other along said the orientation OR1.

In a particular example, the space management S214 is performed such that if the original position PS1 of the space line SL1 is positioned between two consecutive, first and second, items—noted IT1 and IT2—in the first orientation OR1, the first item IT1 is maintained at the same position and the second item IT2 is moved along the first orientation OR1 to create or reduce a space SP1 while maintaining the block layout of the second item with any subsequent item IT present along the first orientation OR1. It allows maintaining unchanged the relative layout of items IT while they are moved along the first orientation OR1 during space management.

Space management can be used in a multicolumn layout. In this case, if the space line is surrounded by one block or more, as soon as said space line reaches the top edge of any of these blocks, the width of the space line increases to envelop those blocks and include them in the group of blocks translated along in response to the movement of the space line. The contrary is not allowed: the space line width cannot decrease while the space line moves.

Second Aspect of the Invention

A second aspect of the present invention is described herebelow in reference with FIGS. 9-15. According to this second aspect, the invention allows efficient and user-friendly insertion of a selected item into an electronic document, thereby ensuring a coherent management of the document layout. This second aspect covers two different techniques for inserting at least one block or item into an electronic document: (1) copy & paste and (2) drag & drop, although other variants are possible. Embodiments of the second aspect of the invention will be described in more details below with respect to these two different techniques.

It is now considered that the computing device DV1 as shown in FIG. 1 is configured to implement the second aspect of the invention, according to a particular embodiment.

According to various embodiments of the second aspect, the invention provides a method implemented by the computing device DV1 for managing block layout, comprising the following steps:
 displaying in an electronic document at least two neighbour blocks (or boxes) contiguous to each other, said at least two neighbour blocks containing text or non-text content;
 detecting, based on a first user instruction, user selection from said electronic document or from another electronic document of a current block which is to be positioned between said at least two neighbour blocks;
 determining, based on a second user instruction, a user-selected insertion region specifying where the current block is to be positioned, said insertion region overlapping with said at least two neighbour blocks;
 rearranging the block layout of said electronic document by moving at least one of said at least two neighbour blocks to create in said insertion region a space sufficiently large to accommodate the current block between said at least two neighbour blocks; and
 positioning the current block according to the insertion region by pasting or dropping the current block within the created space.

The at least two neighbour blocks may comprise a first block and a second block positioned contiguously to each other along a first orientation. Additionally, during the above-mentioned rearranging step, the second block may be moved by translation along the first orientation in a first direction from the first block towards the second block while the first block is maintained at the same position, thereby creating said space.

In a particular example, during the above-mentioned rearranging step, the second block is moved by translation along with at least one other neighbour block subsequent to the second block in the first direction while maintaining the block layout of the second block and said at least one other neighbour block relative to each other.

Figure 9:
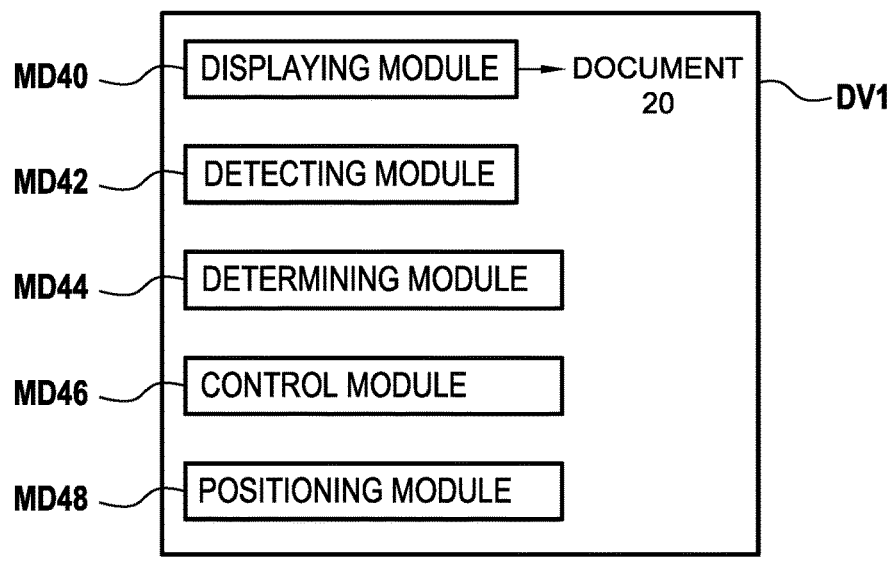
FIG. 9 is a block diagram representing functional modules implemented by a computing device of the second aspect of the invention, according to a particular embodiment.
Figure 10:
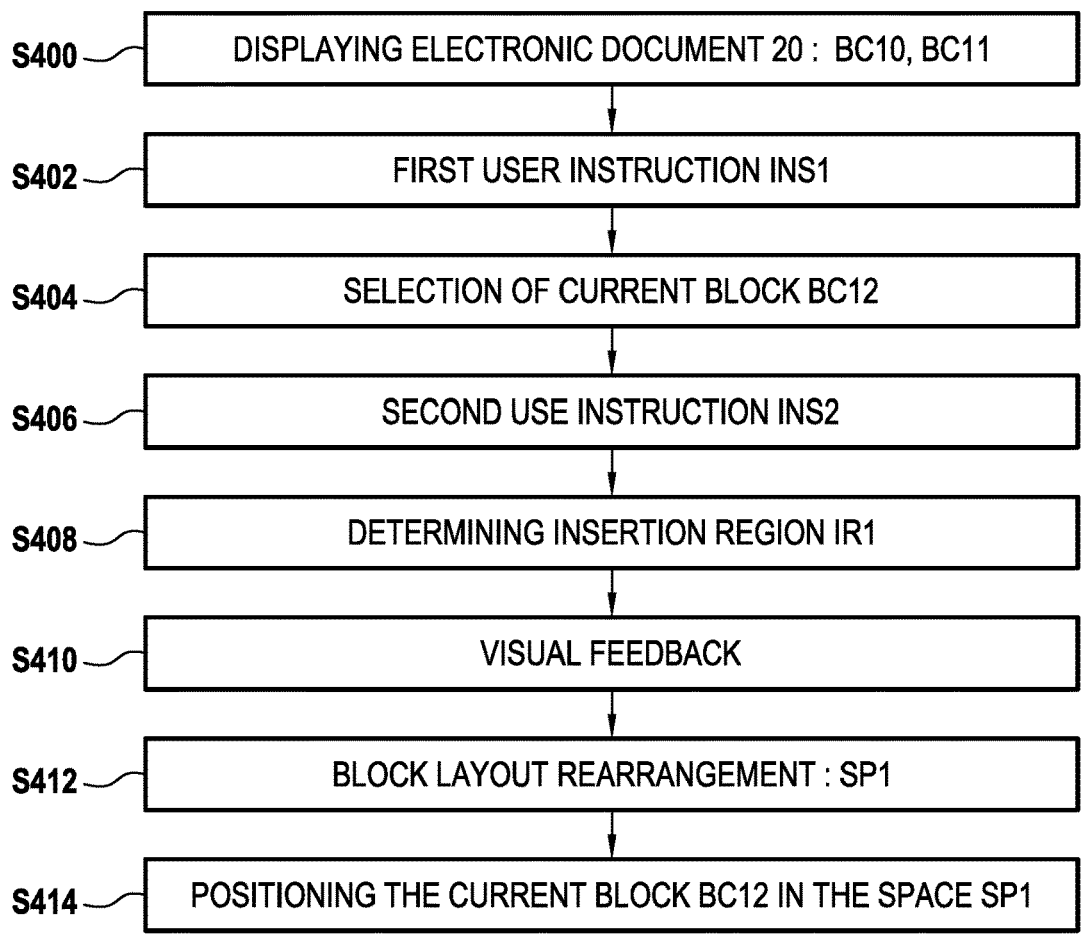
FIG. 10 is a flow chart illustrating the steps of a method of the second aspect of the invention, according to a particular embodiment.

As shown in FIG. 9 according to a particular embodiment, when running the application 12 stored in the memory 8 (FIG. 1), the processor 6 implements modules, namely: a displaying module MD40, a detecting module MD42, a determining module MD44, a control module MD46 and a positioning module MD48.

More specifically, the displaying module MD40 is configured to display in an electronic document at least two neighbour blocks contiguous to each other, said at least two neighbour blocks containing text or non-text content.

The detection module MD42 is configured to detect, based on a first user instruction, user selection from said electronic document or from another electronic document of a current block which is to be positioned between said at least two neighbour blocks.

The determining module MD44 is configured to determine, based on a second user instruction, a user-selected insertion region specifying where the current block is to be positioned, said insertion region overlapping with said at least two neighbour blocks.

The control module MD46 is configured to rearrange the block layout of the electronic document by moving at least one of said at least two neighbour blocks to create in the insertion region a space sufficiently large to accommodate the current block between said at least two neighbour blocks.

The positioning module MD48 is configured to position (or insert) the current block according to the insertion region by pasting or dropping the current block within the created space.

The application 12 may comprise instructions configuring the processor 6 to implement the above-mentioned modules MD40-MD48 in order to perform steps of the method of the second aspect of the invention, as described below in particular embodiments.

The configuration and operation of the modules MD40-MD48 of the computing device DV1 will be more apparent in the particular embodiments described hereinbelow with reference to the figures. It is to be understood that the modules MD40-MD48 as shown in FIG. 9 represent only an example embodiment of the second aspect of the present invention, other implementations being possible.

For each step of the method of this second aspect, the computing device DV1 may comprise a corresponding module configured to perform said step.

A method of the second aspect of the invention, which is implemented by the computing device DV1 as shown in FIGS. 1 and 9, is now described with reference to FIGS. 10 and 11A-11D, in accordance with a first embodiment. In this first embodiment, a copy & paste function is performed to position (by pasting) a selected block into an electronic document. To this end, the computing device DV1 implements the method by executing the application 12 stored in the memory 8.

An example scenario is considered where the computing device DV1 acquires an electronic document 20 into which a user wishes to paste a previously selected block at a particular location of the document. The electronic document 20 comprises at least two neighbour blocks which are contiguous to each other. As shown in FIG. 11A, it is assumed in the present example for the sake of clarity that the electronic document 20 comprises two neighbour blocks (or boxes)—noted BC10 and BC11—which are contiguous to each other. This means that there is no space between these two distinct blocks BC10 and BC11 (these blocks are stuck or "glued" to each other).

The first and second blocks BC10, BC11 may contain any item, such as text and/or non-text content. The configuration (form, content, arrangement etc.) of the blocks BC10 and BC11 may vary depending on each case. In the present example, it is considered that the content CT10 of the block BC10 and the content CT11 of the block BC11 are respectively the handwritten words "hello" and "run".

In a displaying step S400 (FIG. 10), the computing device DV1 displays the electronic document 20 containing the two neighbour blocks BC10 and BC11 as shown in FIG. 11A. As can be seen, these blocks BC10 and BC11 are contiguous such that there is no space between the two neighbour blocks. These blocks BC10, BC11 are positioned contiguously to each other along a first orientation OR1, which is the vertical orientation in the present example although other layout configurations are possible.

In a receiving step S402, the computing device DV1 receives a first user instruction INS1. In the present example, each user instruction INS is received by the computing device DV1 via the user interface 2, for instance using the input surface 4 and/or any other input interface. Each user instruction INS may for instance comprise or take the form of a finger gesture performed with the input surface 4. In the present example, it is assumed that the user performs a finger gesture such as a finger tap, long press or the like on the input surface 4.

In a detecting step S404 (FIG. 10), the computing device DV1 detects, based on the first user instruction INS1, user selection of a so-called current block BC12 which is to be positioned between the two neighbour blocks BC10 and BC11. This user selection may be performed in many different manners, before or after initiating the display S400 of the electronic document 20. The current block BC12 may be selected from the electronic document 20 itself (if the current block BC12 is contained in the electronic document 20) or from any other electronic document (more generally from any other source) that may be accessible for selection. In the present example, this selection is performed as part of a copy for the purpose of later pasting the copied block BC12 into the electronic document 20.

As for blocks BC10 and BC11, the current block BC12 may have various configurations and various content noted CT12. As shown later in FIG. 11D, it is considered an example where the current block BC12 contains the handwritten word "I".

In a receiving step S406 (FIG. 10), the computing device DV1 receives a second user instruction INS2 by means of the user interface 4, for instance as a finger gesture or any other appropriate user instruction. This second user instruction INS2 is for instance received as a finger tap, long press or the like defining a particular location of the electronic document 20. In particular, the second user instruction INS2 may be a tap or press command defining the insertion region IR1 indicative of where the current block BC12 is to be pasted.

As shown in FIG. 11A, the computing device DV1 then determines (S408, FIG. 10), based on the second user instruction INS2, a user-selected insertion region IR1 specifying where the current block BC12 is to be positioned within the electronic document 20, whereby this insertion region IR1 overlaps with the two neighbour blocks BC10, BC11. As shown in FIG. 11A, the insertion region IR1 in this example is circular and covers partially the two contiguous blocks BC10 and BC11. It should be noted however that many configurations of shapes, dimensions and the like are possible for the insertion region. The insertion region IR1 may be centred on the finger location where the user contacted or activated the input surface 4.

The computing device DV1 may verify during step S408 whether the insertion region IR1 overlaps the two neighbour blocks BC10 and BC11 and proceeds with the step S412 only if the result is positive.

FIG. 11B shows a variant where the two neighbour blocks BC10 and BC11 extend such that they partially overlap with each other. The insertion region IR1 defined by the second user instruction INS2 also overlaps with the two blocks BC10 and BC11.

In a displaying step S410 (FIG. 10), the computing device DV1 may also display a graphic indicator FDB1 as a visual feedback of the insertion region IR1 defined by the user by means of the second user instruction INS2. This graphic indicator FDB1 may take any configuration of form, dimension, etc. to assist the user in determining where the insertion position IR1 is positioned within the electronic document 20.

In the present example, the second user instruction INS2 is a user instruction to paste the current block BC12 at a pasting position defined by the insertion region IR1. In the case of the copy-and-paste function, the insertion region IR1 as shown by the visual feedback FDB1 may be a circular region which has always the same form, irrespective of the size and/or shape of the current block BD12 to be pasted.

As shown in FIG. 11C, once the determining step S408 is completed, the computing device DV1 rearranges or modifies (S412) the block layout of the electronic document 20 by moving at least one of the two neighbour blocks BC10, BC11 to create in the insertion region IR1 a space SP10 sufficiently large to accommodate the current block BC12 between the two neighbour blocks BC10, BC11. In the present example, the second block BC11 positioned below the insertion region IR1 is moved by translation downwards while the first block BC10 is maintained at the same position (it remains still), thereby creating a space SP10.

The movement MV10 applied to the second block BC11 may vary depending on each case. More generally, in a case where the two neighbour blocks BC10 and BC11 are positioned contiguously to each other along a first orientation OR1 (which is the vertical orientation in this example), the layout rearranging step S412 may be performed by moving the second block BC11 by translation along the first orientation OR1 in a first direction DR1 (downwards in the present example), which extends from the first block BC10 towards the second block BC11, while maintaining the first block BC10 at the same position, thereby creating the desired space SP10. The orientation OR1 may however be adapted by the skilled person depending on each case.

Various configurations may thus be contemplated regarding how the block BC10 and/or BC11 are moved to accommodate a space in-between. The computing device DV1 may instead move upwards the first block BC10 while maintained the second block BC11 at the same position, or even move simultaneously the first block BC10 and the second block BC11 in respectively the upward and downward direction.

In a variant, the electronic document 20 comprises at least one other neighbour block BC subsequent to the second block BC11 in the first direction DR1 (the downward direction in this example). This at least one other neighbour block BC may be contiguous or remote from the second block BC11 along the first orientation OR1. The layout rearranging step S412 may be performed such that the second block BC11 is moved by translation along with at least one other neighbour block BC subsequent to the second block BC11 in the first direction DR1, while maintaining the block layout of the second block BC11 and said at least one other neighbour block relative to each other.

As shown in FIG. 11D, once the space SP10 has been formed (S412), the computing device DV1 positions or inserts (S414, FIG. 10) the current block BC12 according to the insertion region IR1 by pasting the current block BC12 within the created space SP10.

The invention thus allows efficient, user-friendly and auto-adaptive insertion of a selected block by pasting the selected block in a space created between at least two contiguous blocks. It obviates the need for a user to embark into fastidious and inaccurate manipulations of the blocks of an electronic document. The user is not required to manually arrange a space between contiguous blocks before commanding insertion by pasting of at least one selected block at a location between the blocks. Instead of manually moving the contiguous blocks to accommodate the required room in-between, the computing device DV1 automatically adapts the document layout by moving the neighbour blocks relative to each other, and in response to a second user instruction INS2 commanding insertion by pasting of a selected block in an insertion region overlapping the two or more neighbour blocks. Dynamic and intelligent adaptation of the document layout can be made by adjusting the size of the created space as a function of the size of the current block which is to be pasted.

The second aspect of the invention is however not limited to positioning a current block in a created space by pasting. Instead of performing a copy & paste function, the current block may for instance undergo a function of drag & drop allowing a user to drag the current block through the electronic document and then drop it in a space automatically created between at least two contiguous blocks.

Figure 12:
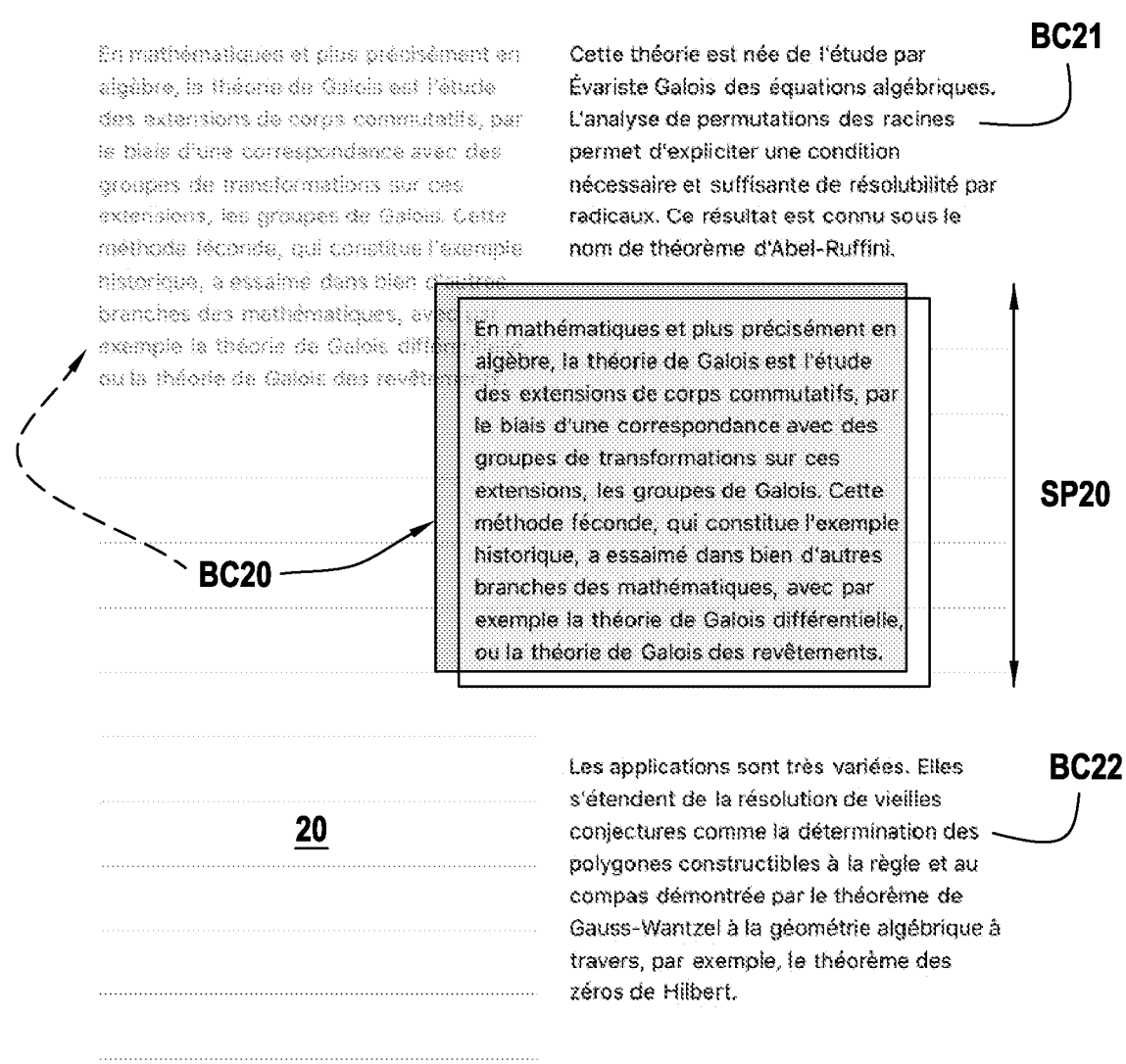
FIG. 12 depicts a conventional technique of drag and drop.

The FIG. 12 illustrates by way of an example an electronic document 20 comprising three text blocks BC20, BC21 and BC22. The blocks BC21 and BC22 are contiguous to each other along the vertical orientation. Assuming that a user wishes to drag and drop the block BC20 between the neighbour blocks BC21 and BC22, he/she may first manually move the blocks BC21 and BC22 relative to each other to accommodate a space SP20 in-between and may then drag and drop the selected block BC20 into the created space SP20. Such manipulations are however fastidious, not always intuitive or user-friendly, and may be source of mistakes.

A method of the second aspect of the invention, which is implemented by the computing device DV1 as shown in FIGS. 1 and 9, is now described with reference to FIGS. 13A-13B, 14 and 15, in accordance with a second embodiment. In this second embodiment, a drag & drop function is performed to position (by drop) a selected block into an electronic document. To this end, the computing device DV1 implements the method by executing the application 12 stored in the memory 8.

The method is performed by executing in an analogous manner the steps S400-S414 described earlier with reference to FIG. 10, but in the context of a drag and drop operation. Unless indicated otherwise, the steps S400-S414 are performed in this example in the same manner as described earlier.

An example scenario is considered where the computing device DV1 acquires an electronic document 20 into which a user wishes to drag and drop a selected block at a particular location of the document. The electronic document 20 comprises at least two neighbour blocks which are contiguous to each other. As shown in FIG. 13A, it is assumed in the present example for the sake of clarity that the electronic document 20 comprises 3 blocks (or boxes) BC30, BC32 and BC34, among which the two neighbour blocks BC30, BC32 are contiguous to each other. This means that there is no space between these two distinct blocks BC30 and BC32 (these blocks are stuck or "glued" to each other). It is assumed that a user wishes to drag and drop the block BC34 from its original position into a new location between the first and second neighbour blocks BC30 and BC32.

The blocks BC30-BC34 may contain any item, such as text and/or non-text content. The configuration (form, content, arrangement etc.) of the blocks BC30-BC34 may vary depending on each case. In the present example, it is considered that the content of the block BC30-BC34 is text.

In a displaying step S400 (FIG. 10), the computing device DV1 displays the electronic document 20 containing the block BC34 and the two neighbour blocks BC30 and BC32 as shown in FIG. 13A. As can be seen, the blocks BC30 and BC32 are contiguous such that there is no space between these two neighbour blocks. These blocks BC30, BC32 are positioned contiguously to each other along a first orientation OR1, which is the vertical orientation in the present example although other layout configurations are possible.

In a receiving step S402, the computing device DV1 receives a first user instruction INS1 via the user interface 2. In the present example, the user presses (or contacts, or activates) the input surface 4 with a finger to select the so-called current block BC34 and then moves the point of contact (or point of activation) to drag the current block BC34 at another location within the electronic document 20.

In a detecting step S404 (FIG. 10), the computing device DV1 detects, based on the first user instruction INS1, user selection of the so-called current block BC34 which is to be positioned between the two neighbour blocks BC30 and BC32. As already indicated, this selection is performed in this example in the context of dragging the current block BC34, in order to later enable the user to drop it at a particular location of the electronic document 20. In the case of drag and drop, the user selection is thus performed while the electronic document 20 is on display so that the user is able to select and drag the current block BC34 within the electronic document 20.

As shown in FIG. 13A, in response to the first user instruction INS1 over time, the computing device DV1 applies a drag movement MV34 onto the current block BC34 which moves from an original position to a new position. In other terms, the computing device DV1 monitors, based on the first user instruction INS1 received over a continuous period of time, a drag movement MV34 of the current block BC34 within the electronic document 20.

As can be seen, the computing device DV1 may display a first graphic indicator FDB34 as a visual feedback representative of the drag movement MV34 over time of the current block BC34 being dragged in the electronic document 20. This first graphic indicator FDB34 visually represents in real-time the selection region that IR30 that the user can select.

Further, during the drag movement MV34, the computing device DV1 may also display a second graphic indicator FDB36 as a visual feedback representative of an insertion position within the insertion region IR30 where the current block BC34 is to be dropped (if the user releases the input surface 4 as described further below).

These graphic indicators FDB34 and FDB36 may take any configuration of form, dimension, etc. to assist the user in determining respectively where the current block BC34 is being dragged (i.e. where the insertion position IR30 is) and where the current block BC34 can be dropped within the electronic document 20. The first graphic indicator FDB34 is for instance a light-grey representation of the current block BC34.

The second graphic indicator FDB36 may be a caret as shown in FIG. 13A, or any appropriate graphic objects such as a rectangle, a line, or the like, which can be moved at interfaces between pair of contiguous existing blocks, such as at the interface of the neighbour blocks BC30 and BC34 in the present example. The display of this second graphic indicator FDB36 reduces the risks of confusion for the user who can easily visualise the current position where the block being dragged can be dropped between two contiguous blocks.

In a receiving step S406 (FIG. 10), the computing device DV1 receives a second user instruction INS2 by means of the user interface 4, for instance as a finger gesture or any other appropriate user instruction. In the present example, the second user instruction INS2 is a user instruction to drop the current block BC34 at a drop position defined by the insertion region IR30. This drop position is located at the interface between the neighbour blocks BC30 and BC32, as represented by the second graphic indicator FDB36. To this end, the user releases the input surface 4 to select the drop position defined by the insertion region IR30, as visually represented by the second graphic indicator FDB36.

The computing device DV1 then determines (S408, FIG. 10), based on the second user instruction INS2, a user-selected insertion region IR30 specifying where the current block BC34 is to be positioned (i.e. dropped) within the electronic document 20, where this insertion region IR30 overlaps with the two neighbour blocks BC30, BC32. As shown in FIG. 13A, the insertion region IR30 in this example is rectangular and covers partially the two contiguous blocks BC30 and BC32. The insertion region IR30 may have the same size and shape as the current block BC34 which is being dragged. It should be noted however that many configurations of shapes, dimensions and the like are possible for the insertion region. The insertion region IR30 may be centred on the location where the user releases (or deactivates) the input surface 4.

The computing device DV1 may verify during step S408 whether the insertion region IR1 overlaps the two neighbour blocks BC30 and BC32 and proceeds with the step S412 only if the result is positive.

As already indicated, the computing device DV1 may display in step S410 (FIG. 10) the first indicator graphic FDB34 and the second graphic indicator FDB36 as visual feedbacks of respectively the insertion region IR30 selected by the user by means of the second user instruction INS2, and the corresponding insertion position where the current block BC34 is to be dropped.

Figure 13B:
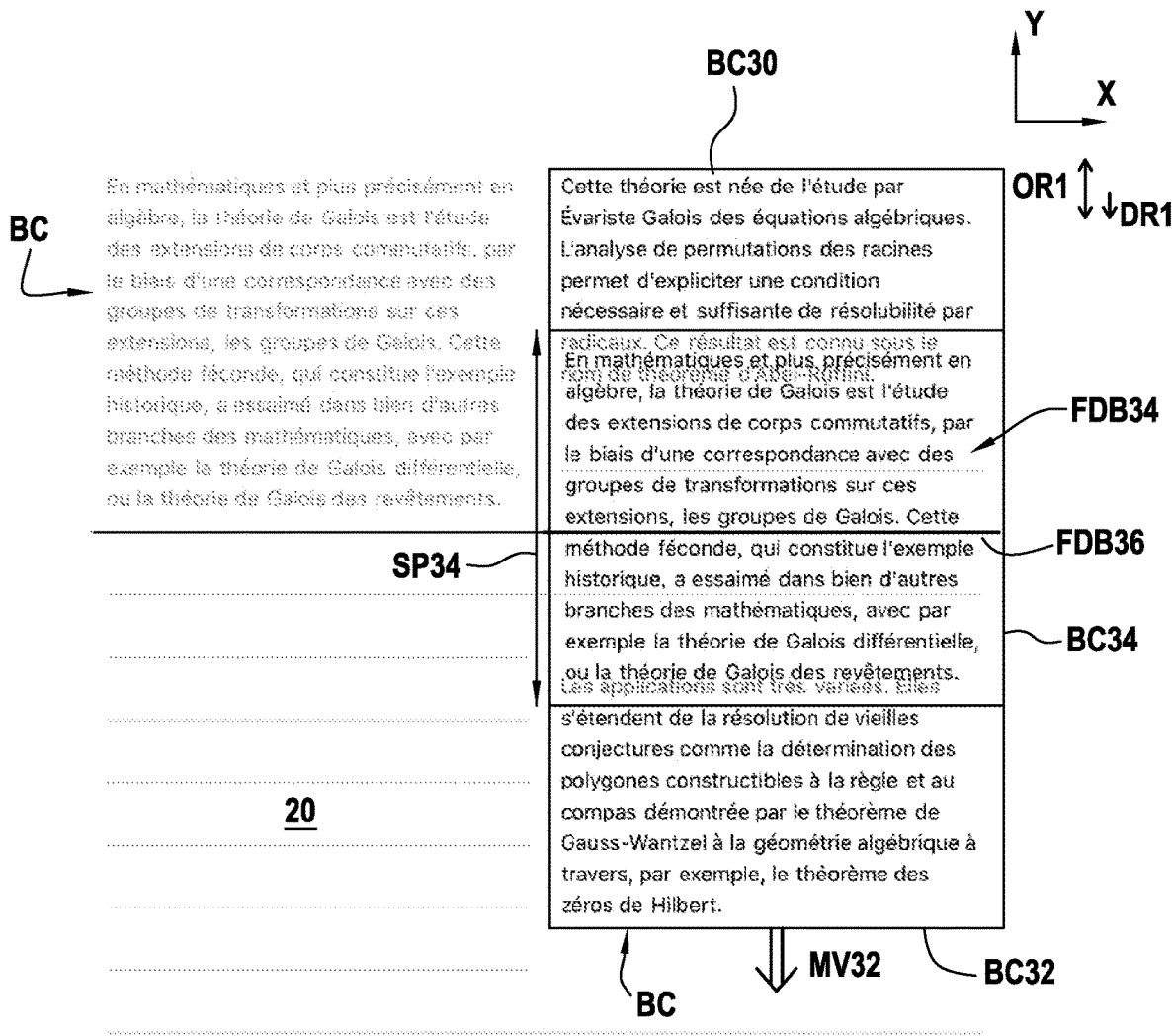

As shown in FIG. 13B, once the determining step S408 is completed, the computing device DV1 rearranges or modifies (S412) the block layout of the electronic document 20 by moving at least one of the two neighbour blocks BC30, BC32 to create in the insertion region IR30 a space SP34 sufficiently large to accommodate the current block BC34 between the two neighbour blocks BC30, BC32. In the present example, the second block BC32 positioned below the insertion region IR30 (more particularly below the drop position) is moved by translation downwards while the first block BC30 is maintained at the same position (it remains still), thereby creating a space SP34.

The movement MV32 applied to the second block BC32 may vary depending on each case. More generally, in a case where the two neighbour blocks BC30 and BC32 are positioned contiguously to each other along a first orientation OR1 (which is the vertical orientation in this example), the layout rearranging step S412 may be performed by moving the second block BC32 by translation along the first orientation OR1 in a first direction DR1 (downwards in the present example) which extends from the first block BC30 towards the second block BC32, while maintaining the first block BC30 at the same position, thereby creating the desired space SP34. The orientation OR1 may however be adapted by the skilled person depending on each case.

Various configurations may thus be contemplated regarding how the block BC30 and/or BC32 are moved to accommodate a space in-between. The computing device DV1 may instead move upwards the first block BC30 while maintained the second block BC32 at the same position, or even move simultaneously the first block BC30 and the second block BC32 respectively upwards and downwards.

In a variant, the electronic document 20 comprises at least one other neighbour block BC subsequent to the second block BC32 in the first direction DR1 (the downward direction in this example). This at least one other neighbour block BC may be contiguous or remote from the second block BC32 along the first orientation OR1. The layout rearranging step S412 may be performed such that the second block BC32 is moved by translation along with at least one other neighbour block BC subsequent to the second block BC32 in the first direction DR1, while maintaining the block layout of the second block BC32 and said at least one other neighbour block relative to each other. A particular implementation is described further below with reference to FIG. 14.

As shown in FIG. 13B, once the space SP34 has been formed (S412), the computing device DV1 positions or inserts (S414, FIG. 10) the current block BC34 according to the insertion region IR30 by dropping the current block BC34 within the created space SP34, more specifically in this example at the dropping position represented by the second graphic indicator FDB36.

The invention thus allows efficient, user-friendly and auto-adaptive insertion of a selected block by dragging and dropping the selected block in a space created between at least two contiguous blocks. It obviates the need for a user to embark into fastidious and inaccurate manipulations of the blocks of an electronic document. The user is not required to manually arrange a space between contiguous blocks before dragging and dropping at least one selected block at a drop location between the blocks. Instead of manually moving the contiguous blocks to accommodate the required room in-between, the computing device DV1 automatically adapts the document layout by moving the neighbour blocks relative to each other, and in response to a second user instruction INS2 commanding insertion by dropping a selected block in an insertion region overlapping the two or more neighbour blocks. Dynamic and intelligent adaptation of the document layout can be made by adjusting the size of the created space as a function of the size of the current block which is to be dropped.

Figure 14:
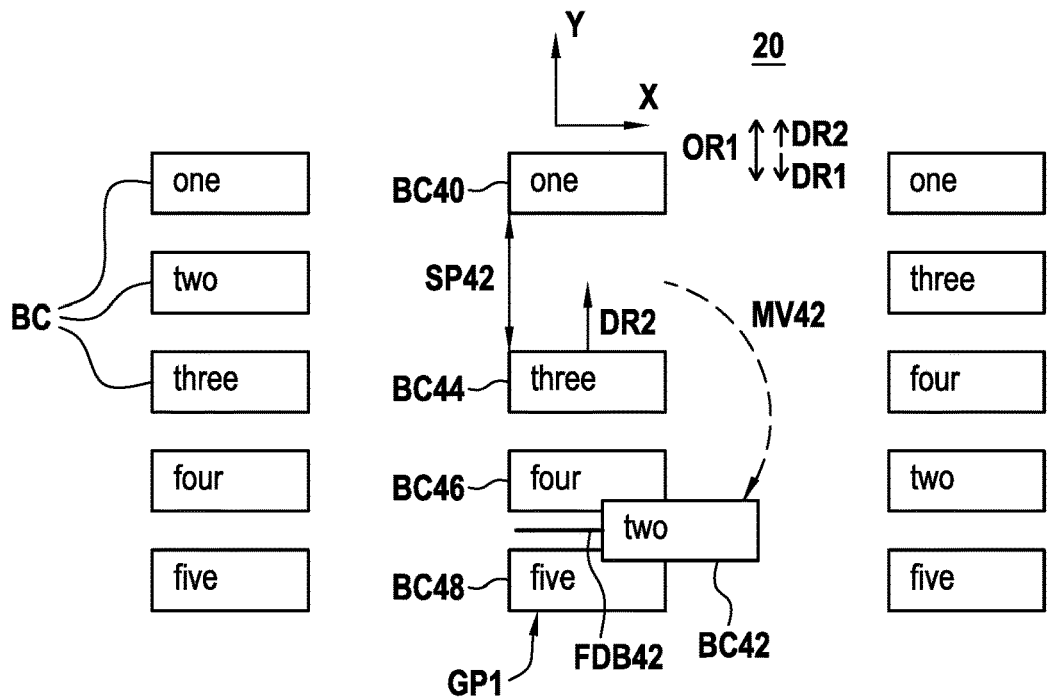
FIG. 14 depicts a variant of the method shown in FIGS. 13A-13B, according to a particular embodiment.

FIG. 14 represents a variant of the second embodiment described above with reference with FIGS. 13A-13B. It is now assumed that a user wishes to drag and drop a block within an electronic document 20. In this case, the current block which is user-selected and then dragged is part of a group of blocks BC contiguous to each other in a group orientation OR1.

To this end, the computing device DV1 implements the method by executing the application 12 stored in the memory 8. The method is performed by executing in an analogous manner the steps S400-S414 described earlier with reference to FIG. 10. Unless indicated otherwise, the steps S400-S414 are performed in this example in the same manner as described earlier with reference to FIG. 10.

More specifically, as shown in FIG. 14, it is considered that the computing device DV1 acquires an electronic document 20 comprising a plurality of blocks (i.e. text blocks). It is assumed that text blocks BC40, BC42, BC44, BC48 and BC48 form collectively a group GP1 of blocks. In this group GP1, the blocks BC40 to BC48 are arranged consecutive to each other along a first orientation OR1, so-called group orientation (i.e. the vertical orientation in this example). The block layout, including the number, arrangement and content of blocks, may vary depending on each case.

In this particular embodiment, it is assumed that the computing device DV1 detects (S404) a user-selection of the current block BC42 in the context of a drag and drop function. At its original position, the current block BC42 is contiguous with the neighbour block BC40 positioned immediately above and with the neighbour block BC44 positioned immediately below. In response to the first user instruction INS1, the selected block BC42 is dragged through the electronic document 20 from its original position to a new position within the electronic document 20.

Upon detecting that the current block BC42 is being dragged within the electronic document 20, the computing device DV1 moves at least one other neighbour block BC of the group GP1 subsequent to the current block BC42 in the group orientation OR1, while maintaining the block layout of said at least one other neighbour block relative to each other, to remove the space SP42 left by the current block BC42 in the block layout of the block group GP1. As shown in the example of FIG. 14, the computing device DV1 adapts the block layout by moving upwards (direction DR2), as one block, the subgroup formed by the blocks BC44, BC46 and BC48 so that these blocks maintain the same block layout relative to each other. The neighbour block BC40, however, remains still.

Alternative implementations are also possible where for instance it is the neighbour block BC40 above the original position of the current block BC42 which is moved downwards (direction DR1) to fill the space SP42. In another variant, both the sub-group of blocks BC44-BC48 on the one hand, and the neighbour block BC40 on the other hand, may be moved respectively upwards and downwards. Other directions DR1, DR2 may also be considered, depending on the group orientation OR1 along which extends the block group GP1.

The invention thus allows an efficient, user-friendly and auto-adaptive management of the block layout to maintain a coherent arrangement of the blocks when a selected block is being dragged out of a group of blocks. The space previously occupied by the selected block, and left empty as a result of the drag movement, is filled by shifting by translation one or more subsequent blocks in the group of blocks.

A method of the second aspect of the invention, implemented by the computing device DV1 illustrated in FIGS. 1, 7 and 9, is now described with reference to FIG. 15, in accordance with a particular embodiment. More specifically, the computing device DV1 implements a selection manager 20 and a page controller 22, as previously described with reference to FIG. 7, to perform a function of drag and drop. To this end, the computing device DV1 implements the method by executing the application 12 stored in the memory 8 to manage the document layout of an electronic document 20 comprising a plurality items (text and/or non-text items).

A first user instruction INS1 is detected by the selection manager 20 and transmitted (S500) to the input manager 24. This first user instruction is for instance a finger gesture, such as a finger-down gesture (e.g. a tap gesture or the like), to select a block which is to undergo drag and drop.

In a determining step S502, the input manager 24 interprets the received first user instruction INS1, in particular to locate a selection point designated by the user in the electronic document 20. The input manager 24 determines (S502) whether the selection point chosen by the user is over (or in) a block BC of the electronic document 20. If the result of the determining step S502 is positive, the input manager 24 detects (S504) that the so-called current block BC designated by the first user instruction INS1 is user-selected and a visual feedback is displayed (S506) by the visual feedback module 26 to visually indicate the block selection, by highlighting the current block in any appropriate manner.

A second user instruction INS2 is then detected by the selection manager 20 and transmitted (S510) to the input manager 24. This second user instruction is for instance a finger gesture, such as a finger-down gesture (e.g. a tap gesture or the like), to initiate a drag movement.

In a determining step S512, the input manager 24 interprets the received second user instruction INS2, in particular to locate a second selection point defined by the user in the electronic document 20. The input manager 24 determines (S512) whether the second selection point chosen by the user is over (or in) the current block BC previously selected in S504. If the result of the determining step S512 is positive, the method proceeds with switching step S520, otherwise it proceeds with an unselecting step S514.

In the unselecting step S514, the computing device DV1 detects that the user has defined a location outside the current block BC previously selected in steps S504 and, as a result, the current block S514 is deselected. The visual feedback module 28 also remove (S516) the visual feedback activated in S506 in order to indicate to the user that the current block BC is no longer selected.

In the switching step S520, the input manager 24 detects (S520) that the current block BC is being selected for a drag movement and thus switches into a drag & drop mode. The visual feedback module 28 also adapts (S522) the visual feedback of the current block to visually indicate this re-selection for performing a drag and drop, for instance by displaying, as visual feedbacks, an (static) original block which represents the current block at its original position within the electronic document 20 (e.g. with a different opacity) and a (moving) temporary drag block which represents the current block BC while it is being dragged through the electronic document 20.

In the present example, the user maintains and moves his finger on (or over) the input surface 4, still as part of the second user instruction, to command the computing device DV1 a drag movement of the current block BC. In other words, the user contacts (or activates) the input surface 4 to re-select (S510-S520) the current block in S504 and then pursues the second user instruction INS2 by moving his finger to drag the current block BC within the electronic document 20. This drag gesture, received as part of the second user instruction INS2, is received by the selection manager 20 and transmitted in step S530 to the input manager 24.

The input manager 24 receives and treats in step S510 the second user instruction INS2 defining a drag movement of the current block BC. Based on the second user instruction INS2, the input manager 24 determines the drag movement applied to the current block BC. In step S510, the input manager 24 continuously monitors the current position of the current block BC as it is being dragged and continuously checks whether a drop of the current block BC is possible at its current location.

The visual feedback module 28 displays (S534) a drop visual feedback (i.e. a caret, a rectangle, a line or the like) to visually indicate a drop position where the current block can be dropped.

The input manager 24 then detects (S540) the end of the second user instruction INS2 that was being received over time from the selection manager 20. To indicate the end of the second user instruction INS2, the user releases for instance the input surface 4 (finger up). In response to the end of the second user instruction INS2, the input manager 20 detects (S542) that the drag movement is terminated and thus drops the current block BC at the current position indicated by the drop visual feedback.

Assuming that the drop position is at an interface between two contiguous blocks, the tree editor 26 adapts the document layout by moving at least one of the contiguous blocks to create a space in-between in order to accommodate the dropped block, as previously described. In the present case, the contiguous block positioned below the drop position is moved downwards and any subsequent block positioned further down is moved down as well to permit creation of the space.

The coordinates of the dropped block BC, and of any other moved block, are transmitted to the visual feedback module 28 which then adapts (S546) the visual feedback on display to indicate that the drop has occurred, for instance by removing the original block generated in step S522 and by changing the opacity of the temporary drag block generated in step S522.

The tree editor 26 may also update the document model DM1 to include the new position of the dropped block and of any other moved block, based on the block coordinates received by the tree editor 26 in step S544.

Third Aspect of the Invention

A third aspect of the present invention is described herebelow in reference with FIGS. 16-20. According to this third aspect, the invention allows a user to adapt the block layout of an electronic document in an intuitive and efficient manner. Embodiments of the third aspect of the invention will be described in more details below with respect to these two different techniques.

A method of the third aspect of the invention may involve displaying in an electronic document at least two blocks containing text or non-text content; storing an original position of a selected block; in response to detecting movement of a selected block handle, resizing the selected block by increasing said current block in a first resizing orientation while adapting a layout of said electronic document. The layout adapting may comprises: reducing an empty space between the selected block and a first neighbour block as long as this empty space is not fully removed; and if there is no empty space between the current block (because there was no such an empty space from the start and because the empty space has been removed as a result of the empty space reduction), moving the first neighbour block along with any other neighbour block subsequent to the first neighbour block in the first orientation.

It is now considered that the computing device DV1 as shown in FIG. 1 is configured to implement the third aspect of the invention, according to a particular embodiment.

The temporary model information IF1 are temporary data defining a block layout of the electronic document 20. As described further below, the temporary model information IF1 may be temporarily generated and used to manage the block layout of the electronic document 20 and to update the document model DM1 when necessary.

Figure 16:
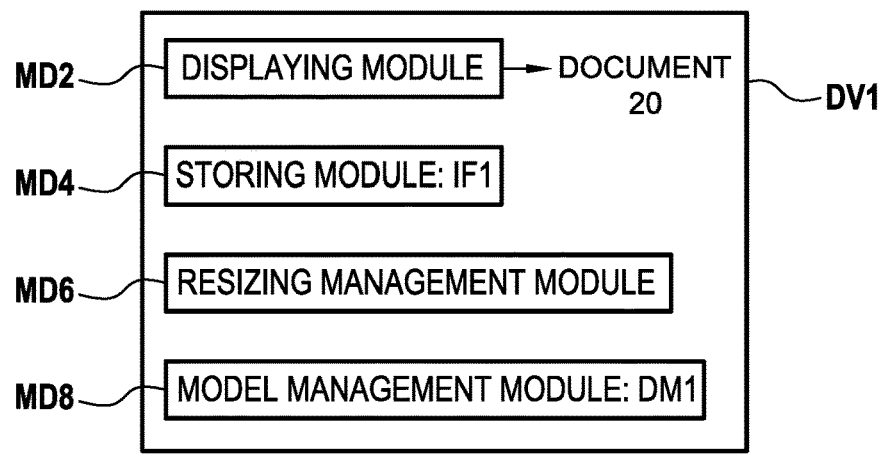
FIG. 16 is a block diagram representing functional modules implemented by a computing device of the third aspect of the invention, according to a particular embodiment of the present invention.

As shown in FIG. 16 according to a particular embodiment of the third aspect, when running the application 12 stored in the memory 8 (FIG. 1), the processor 6 implements modules, namely: a displaying module MD2, a storing module MD4, a layout management module MD6 and a model management module MD8.

The displaying module MD2 is configured to display blocks of content in an electronic document 20.

The storing module MD4 is configured to store temporary model information IF1 defining original positions of blocks in the electronic document 20.

The layout management module MD6 is configured to, in response to user commands, manage the block layout of the electronic document 20, for instance to resize a selected block within the electronic document. The block layout management carried out by the layout management module MD6 may involve, in addition to resizing a selected block, layout adaptations such as reducing empty space between the selected block and a neighbour block and/or translating (moving) at least one neighbour block positioned in the vicinity of the selected block. The resizing may also lead to text reflow in case the selected block contains text.

The application 12 comprises instructions configuring the processor 6 to implement the above-mentioned modules MD2-MD8 in order to perform steps of a method of the invention, as described later in particular embodiments.

The configuration and operation of the modules MD2-MD8 of the computing device DV1 will be more apparent in the particular embodiments described hereinbelow with reference to the figures. It is to be understood that the modules MD2-MD8 as shown in FIG. 16 represent only an example embodiment of the present invention, other implementations being possible.

For each step of the method of the present invention, the computing device DV1 may comprise a corresponding module configured to perform said step.

A method implemented by the computing device DV1 illustrated in FIGS. 1 and 16 is now described with reference to FIGS. 17 and 18A-18C, in accordance with particular embodiments of the third aspect of the invention. More specifically, the computing device DV1 implements this method by executing the application 12 stored in the memory 8.

An example scenario is considered where the computing device DV1 acquires an electronic document 20 comprising text and/or non-text content in the form of blocks (or boxes) BC. The configuration (form, content, etc.) of the blocks may vary depending on the case.

A block may for instance extend through the full width of the electronic document 20. A full-width block may also be called a section (e.g. free-writing section). In a particular example, the electronic document 20 comprises at least one said section.

In the present example, the electronic document 20 comprises a block BC1 containing a diagram (content CT1) and blocks BC2, BC3 and BC4 containing text (noted respectively CT2, CT3 and CT4). The diagram in block BC1 comprises text and containers. The nature, number and layout of the blocks may vary depending on each case.

Figure 18A:
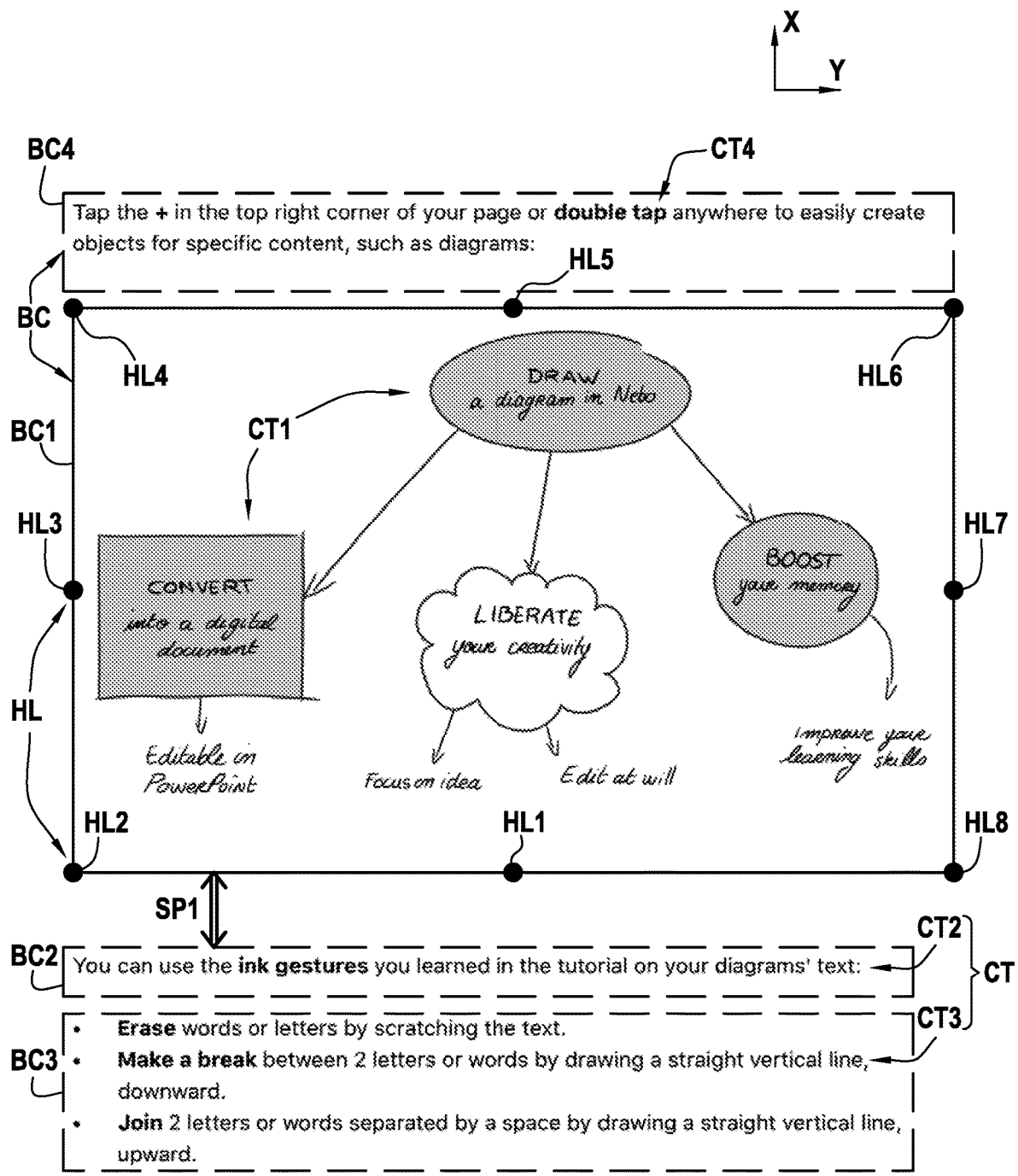
FIGS. 18A, 18B and 18C depict different steps of a method of the third aspect of the invention, according to a particular embodiment.

As can be seen, the blocks BC form a sequence of successive blocks in the x direction (FIG. 18A). The blocks BC are arranged relative to each other in accordance with an initial block layout which is stored or reflected in the document model DM1. Each pair of consecutive blocks may be separated by an empty space (with no content) or may be adjacent to each other. In the present example, the diagram block BC1 is spaced apart from the neighbour block BC2 by a non-empty space noted SP1. Other implementations are however possible.

It is assumed that the electronic document 20 containing the blocks BC1-BC4 is displayed on the display unit 5. In this example, each of blocks BC1-BC4 can be visualised by a user. Each block BC1-BC4 is initially arranged at an original position in the electronic document 20, according to an original block layout. The present method allows managing or controlling this block layout to adapt the arrangement of the blocks (position, size, etc.).

In the present case, the blocks BC1-BC4 are arranged as a sequence of consecutive blocks along a direction x. The current block BC1 has a first neighbour block BC2 subsequent to (immediately next to) the current block BC1 on one side (i.e. below) and another neighbour block BC4 immediately preceding the current block BC1 on the other side (i.e. above). Another neighbour block BC3 is positioned below subsequent to the first neighbour block BC2 in the downward direction.

In a detecting step S2, the computing device DV1 detects that a user selects the block BC1 by means of the input interface 4. This selected block BC1 is designated as the current block. Selection of the current block BC1 can be performed in any appropriate manner, using for instance a finger to interact with a touchscreen of the user interface 2, a mouse, pen, key or the like.

In a displaying step S4, in response to detecting that the block BC1 has been selected, the computing device DV1 displays block handles HL1-HL8 (designated collectively as HL) associated with the block BC1. In this example, 8 block handles are uniformly distributed along the boundary of the selected block BC1. The form, number and position of the block handles HL may however vary depending on each case. In general, the current block BC1 may be displayed with at least one block handle HL.

Block handles may be selected and used by a user to control the size of the block BC1.

In a variant, the block handles HL are displayed automatically without the need for the user to select (S2) the current block BC1.

For instance, the current block BC1 which is subject to resizing as described in the present embodiment (and in the same manner in the other embodiments below) may be a full-width block (i.e. section). In a particular example, a section comprises a plurality of block handles which are always displayed (or visible) in the electronic document 20, even if the section is not currently selected. On the other hand, any other blocks (e.g. text blocks or diagram blocks)—the ones which are not full-width blocks—comprises multiple block handles which are displayed (or visible) only when this block is currently selected. Thus, the selection step S2 may be required to render visible the handles of a not-full-width block so that resizing as described below can be performed. However, if resizing of a full-width block is desired, the selection step S2 is not necessary.

In a selection step S6, the computing device detects that a user selects a block handle HL1 (by means of the input interface 4 in this case). In the present case, it is assumed that the selected handle HL1 is a bottom handle of the current block BC1.

Upon detection selection of the block handle HL1, the computing device DV1 enters (S8) into a resize mode ME1 Once the resize mode ME1 is activated, the computing device DV1 may manage the block layout of the electronic document 20 according to steps S10-28 as described below.

More specifically, upon detecting that the resize mode ME1 has been activated, the computing device DV1 stores the original position of the current block BC1 in the electronic document 20. This original position is stored in temporary model information IF1, in memory 8 in the present example. The computing device DV1 may also store as temporary model information IF1 other temporary data, for instance the original positions of neighbour blocks such as BC2 and BC3, or possibly all the other blocks BC2-BC4. The temporary model information IF1 are temporarily kept in storage as long as the resize mode ME1 is active.

Figure 18B:
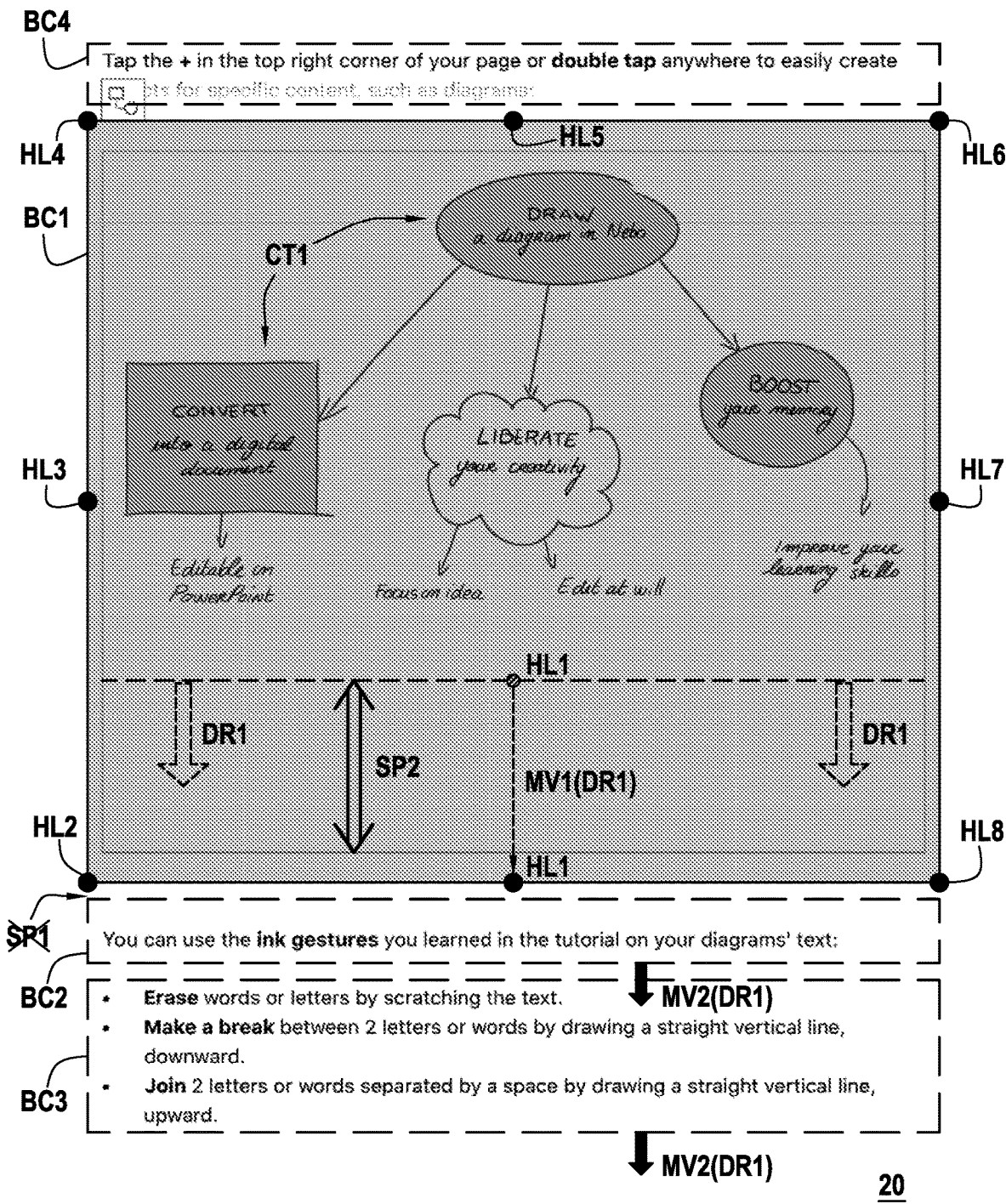

As shown in FIG. 18B, the computing device then detects (S12) a movement MV1 (i.e. a translation movement) of the selected bottom block handle HL1 in a direction designated as a first handle direction (or first handle movement direction) DR1. In the present example, the first handle direction DR1 is downwards. The user drags down (or draws down) the block handle HL1 to resize up the current block BC1.

Responsive to detection of the movement MV1, the computing device DV1 resizes (S14: first resizing) the current block BC1 by increasing said current block in a first resizing orientation. In the present case, the first handle orientation DR1 and the first resizing orientation are the same and are thus collectively designated as DR1. Other implementations are however possible where the first handle orientation and the first resizing orientation are different, as described further below.

The current block BC1 is thus expanded (or increased) downwards in S14 while the block layout of the electronic document 20 is adapted according to steps S16-S20 described below. Expansion of the current block downwards causes the bottom boundary of the current block BC1 to be translated downwards by a distance corresponding to the dragging movement MV1. The downwards expansion creates an empty space SP2 within the current block BC1, at the bottom thereof between the diagram content CT1 and the bottom boundary of the current block BC1.

The temporary model information IF1 may be also updated (S14) while the current block BC1 is resized to keep in store the current layout configuration of the current block BC1.

More specifically, while expanding downwards the current block BC1, the computing device DV1 determines (S16) whether an empty space SP1 exists between the current block BC1 and a first neighbour block BC in the first resizing orientation DR1 (i.e. the first block BC immediately consecutive to the current block BC1 in the block sequence along the first resizing orientation), namely BC2 in the present case. If no empty space exists in the original block layout between BC1 and BC2, then the method proceeds directly to step S20. Otherwise, the method proceeds to step S18.

In the present case, it is assumed that a empty space SP1 separates the current block BC1 from the first neighbour block BC2 below and thus the computing device proceeds to step S18. While the current block BC1 is expanded downwards, the empty space SP1 is reduced (S18) to make room for the expanding current block BC1. The empty space SP1 is reduced (S18) as long as it is not fully removed.

If the empty space SP1 is fully removed during the reduction step S18 (or if there was in fact no empty space SP1 from the start between the current block BC1 and the first neighbour block BC2 at their original positions, i.e. according to the original block layout), the method proceeds to a translating step S20.

In the translating step S20, the computing device DV1 moves by translation the first neighbour block BC2 in the first resizing orientation DR1 along with any other neighbour block BC subsequent to the first neighbour block BC2 in the first resizing orientation DR1. In the present case, the neighbour blocks BC2 and BC3 are thus translated collectively downwards to make room while the current block BC1 is expanded downwards in response to the movement MV1 of the block handle HL1.

During translation S20, the first neighbour block BC2 is thus moved along with at least one other neighbour block (i.e. block BC3 in this example) subsequent to the first neighbour block in the first resizing orientation DR1 while maintaining the layout of the first neighbour block BC2 and said at least one other neighbour block (BC3) relative to each other. In particular, the distance between the first neighbour block BC2 and the next neighbour block BC3 is maintained constant while they are translated (S16) downwards. If an empty space initially exists between BC2 and BC3, it is maintained unchanged. If no empty space initially exists between BC2 and BC3, then these two blocks are maintained in this relative arrangement while being translated (S20) downwards.

Upon detecting that the neighbour blocks BC2 and BC3 are moved, the computing device DV1 stores in the temporary model information IF1 the original positions of the neighbour blocks BC2 and BC3. Additionally, while the neighbour blocks BC2 and BC3 are translated down (S20), the computing device DV1 may store in the temporary model information IF1 the current position of the neighbour blocks BC2 and BC3.

The present invention thus allows a user to adapt the block layout of an electronic document in an intuitive and efficient manner. The selected block BC1 can be expanded downwards while adapting the global block layout of the electronic document 20. The user may have purposefully arranged the neighbour blocks BC2 and BC3 in a particular manner, for instance to obtain a particular visual effect. The block layout is thus adapted to allow easy resizing of a selected block while preserving as much as possible the user's initial intention.

Figure 18C:
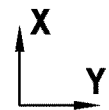

In a particular example, the method continues where the computing device DV1 detects (S22) that the block handle HL1 is now moved in a second handle direction DR2 (i.e. upwards) opposite to the first handle direction DR1 (FIG. 18C). This dragging movement of the block handle HL1 is noted MV3. At this stage, the block handle HL1 is still user selected and the computing device DV1 is still operating in the resize mode ME1 The user may drag upwards the still-selected block handle HL1 by means of the input interface 4.

Responsive to this detection S22, the computing device DV1 resizes (second resizing) the current block BC1 by decreasing (contracting) the current block in a second resizing orientation (DR2) opposite to said first resizing orientation while re-adapting the layout of the electronic document 20 according to step S26 described below. The contraction or decrease in size of the current block BC1 means that its bottom boundary is thus moved back upwards towards its original position. This upwards contraction leads to the reduction of the empty space SP2 within the current block BC1.

The temporary model information IF1 may be also updated (S24) while the current block BC1 is resized to keep in store the current layout configuration of the current block BC1.

More specifically, while resizing down the current block BC1, the computing device DV1 moves back (S26) in the second resizing orientation DR2 (upwards) the first neighbour block BC2 along with any other neighbour block below (i.e. BC3 in this example) until their respective original positions are reached. This movement by translation of the neighbour blocks BC2 and BC2 is noted MV4 (FIG. 18C). The upward translation causes the neighbour block BC2 and BC3 to return to their original positions if the dragging movement MV3 of the user is sufficient.

While the translating movement MV4 is being performed, the layout of the neighbour blocks BC2 and BC3 relative to each other is maintained constant (S26). In particular, the distance between the neighbour blocks BC2 and BC3 is maintained unchanged in the same manner as in translating step S20. To allow the neighbour blocks BC2 and BC3 to be translated up to their original positions, the computing device DV1 consults the original positions as previously stored in the temporary model information IF1. Control of the neighbour blocks BC2-BC3 in the second resizing orientation DR2 is thus performed based on the temporary model information IF1.

The present invention thus allows a user to adapt the block layout of an electronic document 20 in an intuitive and efficient manner. The selected block BC1 can be expanded downwards and then contracted upwards while adapting the global block layout of the electronic document 20 so as to respect to the user's initial intention regarding the block arrangement.

Figure 17:
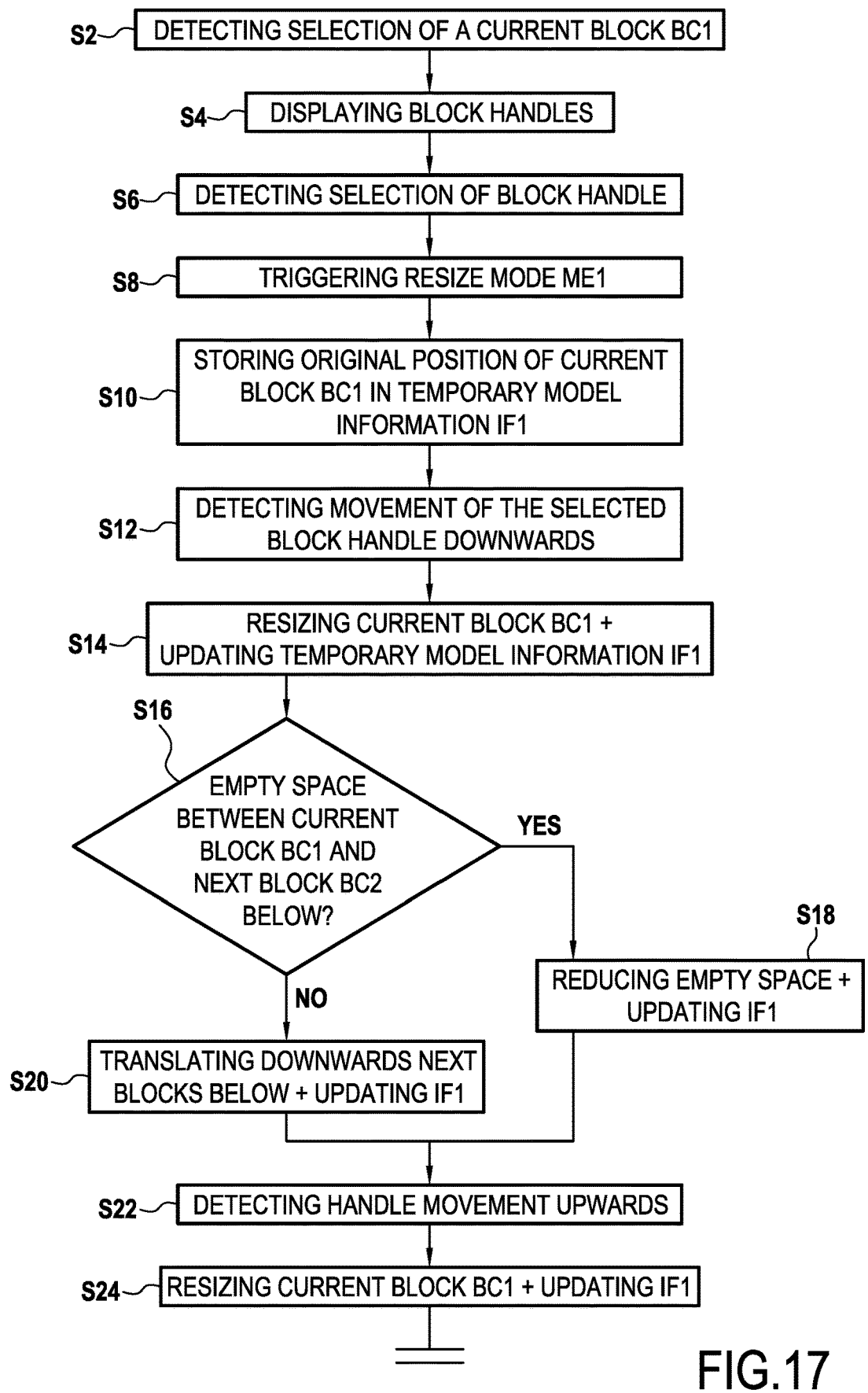
FIG. 17 is a flow chart illustrating the steps of a method of the third aspect of the invention, according to a particular embodiment.

As shown in FIG. 17, in response to detecting (S28) that the block handle HL1 is deselected (termination of the selection), the computing device DV1 terminates the resize mode ME1 and proceeds with steps S32 and S34 as described below. Unselection of the block handle HL1 may result from any given user command transmitted via the input interface 4, such as a pen up or finger up event (generally called "handle up event").

More specifically, upon ending the resize mode ME1, the computing device DV1 updates (S32) the document model DM1 with the temporary model information IF1 to reflect the new positions of the blocks BC as a result of steps S2-20, and possibly of S2-S26 as described earlier.

Once the document mode DM1 has been updated (S32), the computing device DV1 erases the temporary model information IF1 to save memory space.

It should be understood that numerous other implementations of the invention may be contemplated. In the above example, the content CT1 of the current block BC1 is maintained unchanged (no resizing) while the block is being expanded and then contracted. In a variant, the content CT1 of the current block BC1 is resized accordingly to be adapted to the size of the current block BC1. The content CT1 may be expanded (increased in size) when the current block BC1 is expanded, and vice versa.

Other embodiments applying the concept of the invention are described further below. In these other embodiments, the description regarding the computing device DV1, the electronic document 20 and the way the block layout thereof is managed apply in the same or analogous manner, unless indicated otherwise.

In the example described above with reference to FIGS. 18A-18C, the current block BC1 which is resized contains a diagram. As already indicated, other kinds of content may be contemplated, such as text content for instance. In case the current block BC1 contains text, text reflow may be performed.

Figure 19B:
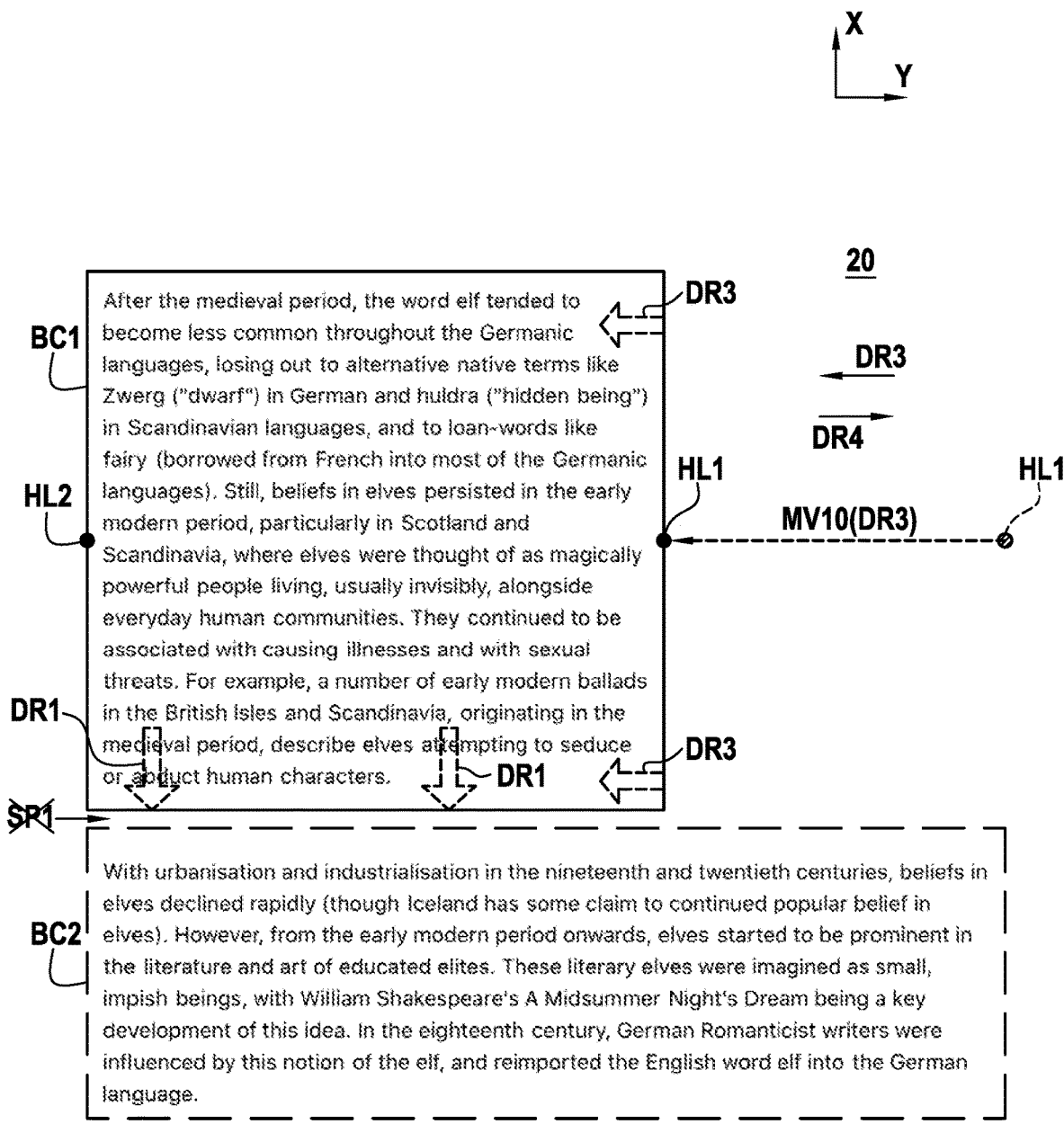
Figure 19C:
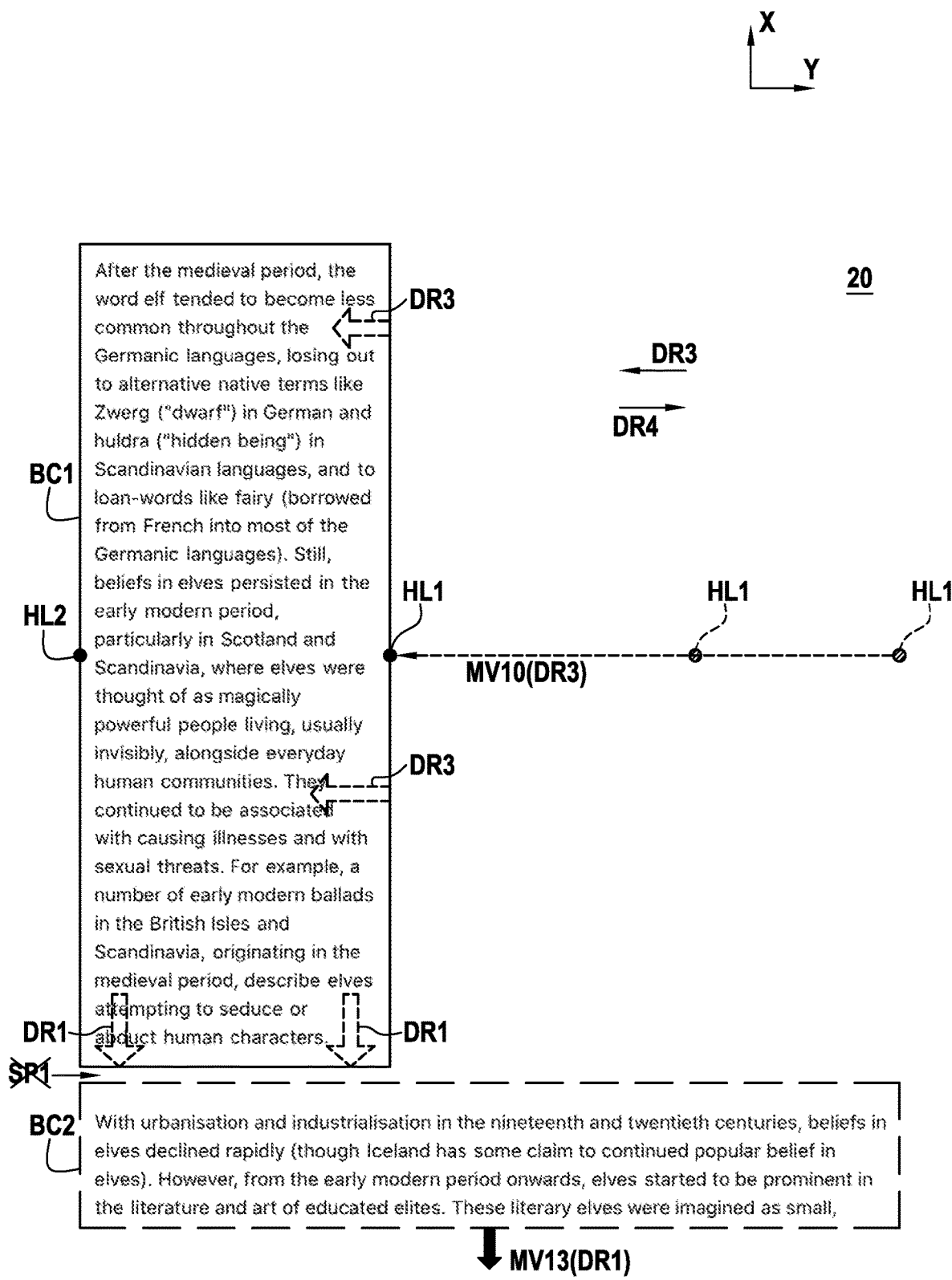

FIGS. 19A-19C depict an example where text reflow is perform while the current block BC1 is resized. More specifically, it is now assumed that the electronic document 20 comprises two text blocks BC1 and BC2 which both contain text (noted CT1 and CT2, respectively). The blocks BC1 and BC2 are arrange at original positions according to an original block layout. It is assumed that the two text blocks BC1, BC2 are separated from each other by an empty space SP1 in the x direction. The concept of the present invention may be applied to the present electronic document 20 to adapt the layout of blocks BC1-BC2 in response to user's instructions.

The steps S2-S34 of the method may be performed in the same manner as described earlier with respect to FIG. 17, except that the first (respectively second) handle direction according to which the block handle HL1 of the current block BC1 is moved is a different orientation from the first (respectively second) resizing orientation according to which the current block BC1 is resized.

As shown in FIGS. 19B, the block handle HL1 that is detected in S6 as being user selected in the present example is positioned on a right boundary of the current block BC1. In S12, the computing device DV1 detects that the right block handle HL1 is moved in a first handle orientation noted DR3, i.e. leftwards in the present case. This movement of the block handle HL1 by translation to the left is noted MV10. The user drags the block handle HL1 leftwards to reduce the size of the current block BC1 in the y direction, thereby causing expansion of the current block BC1 in the x direction.

More specifically, as shown in the successive stages of FIGS. 19B and 19C, in response to detecting (S12) the movement MV10 of the selected block handle HL1 in the first handle orientation DR3, the computing device DV1 resizes (first resizing) the current block BC1 by increasing or expanding the current block BC1 in the first resizing orientation DR1 while adapting the layout of the electronic document 20 as already described earlier (steps S16-S20, FIG. 17).

The movement MV10 thus causes simultaneously a contraction of the current block BC1 along the first handle orientation DR3 and a corresponding expansion of the current block BC1 along the first resizing orientation DR1, in order to make room for the text therein which is reflowed (in the x direction) so as to be adapted to the new boundary configuration of the current block BC1. As a result, the relative positions of the characters (or symbols) forming the text content CT1 are re-rearranged within the text block BC1. Adaptation of the block layout is performed in the same manner as described earlier in steps S16-S20, by reducing the empty space SP1 (if any) between the current block BC1 and the first neighbour block BC2 (S18) as shown in FIG. 19B, and by translating downwards (DR1) the block BC2 (movement MV13) if no empty space exists between BC1 and BC2 as shown in FIG. 19C. In the present case, there is no other neighbour block BC subsequent to the first neighbour block BC2 in the block sequence but a movement by translation of the first neighbour blocks BC2 below the current block BC1 would be performed in the same manner as described earlier in S20 if that was the case.

Figure 20:
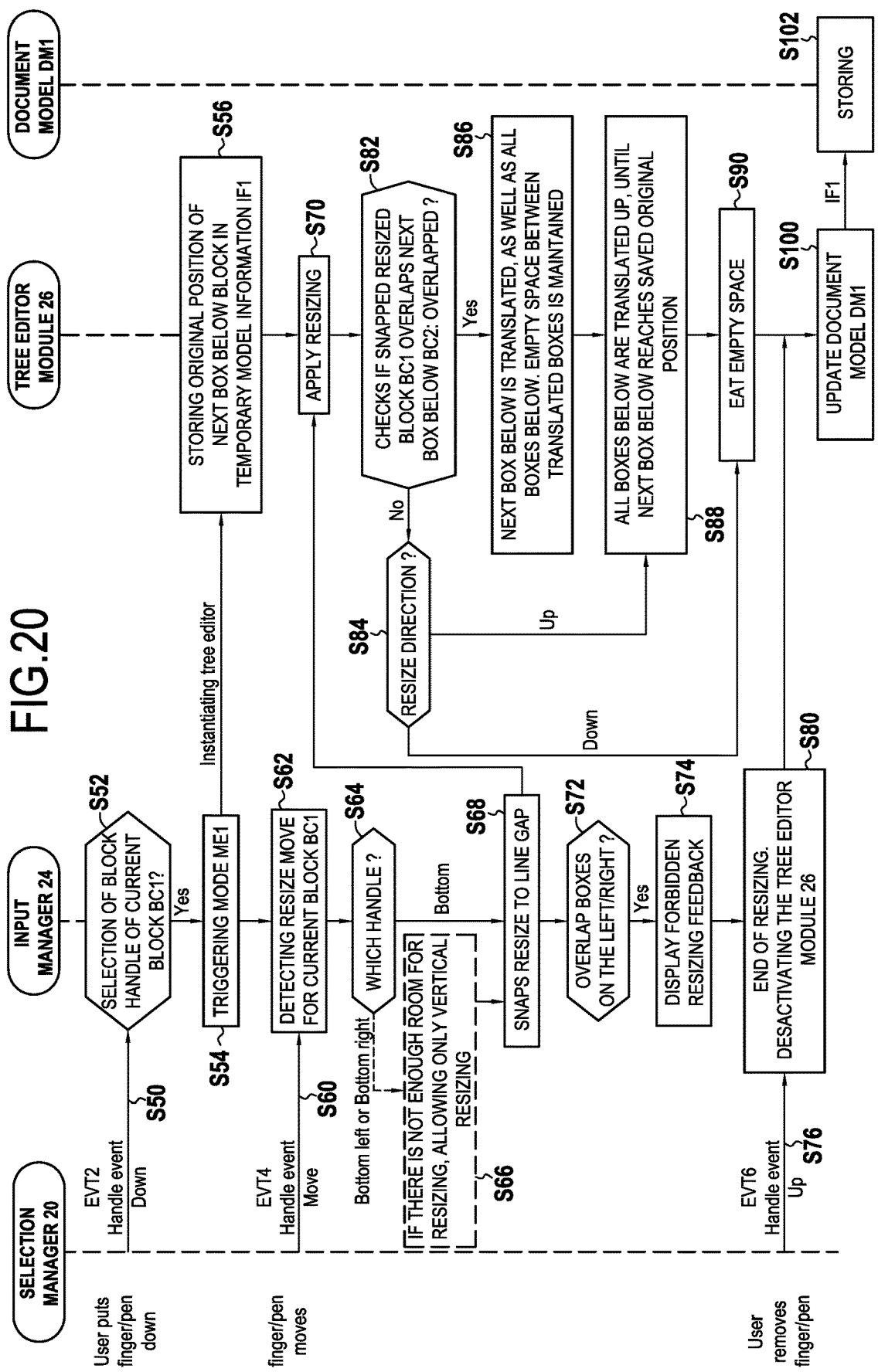
FIG. 20 is a flow chart illustrating the steps of a method of the third aspect of the invention, according to a particular embodiment.

A method implemented by the computing device DV1 illustrated in FIGS. 1, 7 and 16 is now described with reference to FIG. 20, in accordance with a particular embodiment of the present invention. More specifically, the computing device DV1 implements this method by executing the application 12 stored in the memory 8.

An event EVT2 corresponding to a "Handle event down" event is generated (S50) by the selection manager 20 (using the input interface 4) and received (S50) by the input manager module 24. This event EVT2 means that a user has selected a block handle HL1 of a current block BC1 of an electronic document 20 displayed by the computing device DV1, as already described in the previous embodiments. Handle selection may be performed by a finger tap.

In a particular example, the computing device DV1 previously detects that the current block BC1 has been user selected (e.g. by a user tap) and, in response thereto, displays the block handles of the selected block BC1.

In the present case, in response to EVT2, the input manager module 24 determines (S52) whether the finger position is within a predefined region (e.g. within a predefined radius range) around a block handle of the current block BC1. Based on this determination, it is assumed that the input manager module 24 detects that block handle HL1 is selected by the user.

In response to the handle selection S52, the input manager module 24 triggers (S54) the resize mode ME1 and instantiates (or activates) the tree editor module 26. In a storing step S56, the tree editor module 26 stores the original positions of the blocks BC (i.e. the current block BC1 and at least one neighbour block BC).

An event EVT4 corresponding to a "Handle up move" event is then generated (S60) by the selection manager 20 (using the input interface 4) and received (S60) by the input manager module 24. This event EVT4 means that the user has moved (dragged) the selected block handle HL1 of the current block BC1 in a first handle orientation, as already described in the previous embodiments. Handle movement may be performed by drag movement of a finger on a screen of the user interface 2.

In response to event EVT4, the input manager module 24 detects (S62) that the current block BC1 is to be resized (resize command).

In a determination step S64, the input manager module 24 determines which handle is being moved. If the selected handle—noted HL1—is a bottom left or a bottom right handle of the current block BC1, the method proceeds to step S66. If, however, the selected handle HL1 is a bottom handle, the method proceeds to step S68.

In step S66, if there is not enough room for resizing the current block BC1 in the electronic document 20, the input manager module 24 allows only vertical resizing.

In step S68, the input manager module 24 moves (snaps) down in ordinate the pen (or finger) position to the closest possible position on the display (closest horizontal line of a note grid). In response to the finger position movement in S68, the input manager module 24 instructs (S70) the tree editor module 26 to manage the block layout accordingly and also proceeds to step S72. The input manager 24 continuously transmits (S68) instructions to the tree editor module 26 based on the movements of the selected handle HL1 detected as handle move events EVT4.

In step S72, for each received handle move event EVT4, the input manager module 24 checks whether the finger position movement S68 leads to an overlap of the current box BC1 with a neighbour box on the left and/or right. If yes, the input manager module 24 causes display of a forbidden resizing feedback using the user interface means 2, to indicate to the user that the requested resizing of the current block BL1 is forbidden.

In step S70, the tree editor module 26, responsive to the instruction send by the input manager module 24 in S68, applies the resizing of the current block BC1. Resizing S70 is done by expanding the current block BC1 downwards (DR1), and possibly by later contracting back the current block BC1 upwards (DR2), as previously described with reference to FIGS. 18A-18C. The block layout is also adapted as described hereafter.

In step S82, the tree editor module 26 checks whether the resizing S70 leads to the resized block BC1 overlapping a next block BC2 below (the first neighbour block immediately below BC1). If yes, the method proceeds to step S86, otherwise (no overlap) the method proceeds to step S84. The overlap checking S82 is done continuously while the current block BC1 is being resized (S70) to adapt the block layout of the electronic document 20 accordingly.

In step S84 (no overlap currently detected with the next block BC2 below), the tree editor module 26 determines the resize orientation that is being applied on the current block BC1. If the bottom handle HL1 under selection is drawn up (i.e. if the current block BC1 is being contracted upwards), the method proceeds to step S88. If, however, the bottom handle HL1 is drawn down (i.e. if the current block BC1 is being expanded downwards), the method proceeds to step S90.

In step S90 (resizing downwards), the tree editor module 26 reduces (shrinks down) the empty space SP1 (if any) existing between the current block BC1 and the next block BC2 below. If no empty space SP1 exists at some point between the current block BC1 and the next block BC2 below (because there was none originally or because it has been fully removed), it is detected in S82 by the tree editor module 26 which then proceeds to step S86.

In step S88 (resizing upwards), the tree editor module 26 translates (moves by translation) upwards each neighbour block BC positioned below the current block BC1, until the first next block below reaches its original position (as defined in the temporary model information IF1 stored in S56). As already indicated, if multiple blocks are positioned below the current block BC1, they are all translated together while conserving the same layout relative to each other (as already described with references to FIGS. 18A-18C and 19A-19C). These multiple blocks are moved back upwards until they all reached their original position.

In step S86 (overlap currently detected with the next block BC2 below), the tree editor module 26 translates downwards the next block BC2 below as well as any other block below the next block BC2 (as already described with references to FIGS. 18A-18C and 19A-19C), to accommodate room necessary to the resizing of the current block BC1. In particular, if multiple blocks BC are moved downwards, they all maintain the same layout relative to each other (same distance between each other) as they move downwards, as already described.

While the current block BC1 is being resized (S70) and the block layout is adapted accordingly (S82-S90), the tree editor module 26 may update the temporary model information IF1 to reflect the respective current position of each block affected by these operations. The original positions of the next blocks BC below the current block BC1 are determined when necessary based on the stored temporary model information IF1.

An event EVT6 corresponding to a "Handle up" event is later generated (S76) by the selection manager 20 (using the input interface 2) and received (S76) by the input manager module 24. This event EVT6 results in this example from the fact that the user has moved up his finger to release and thus deselect the block handle HL1 of the current block BC1, as already described in the previous embodiments.

In response to event EVT6, the input manager module 24 ends (S80) the resize mode ME1 and instructs (S80) the tree editor module 26 to terminate the block layout management.

Responsive to the instruction send by the input manager module 24 in S80, the tree editor module 26 updates (S100) the document model DM1 (FIGS. 1 and 16) to reflect the current positions of the blocks BC and the block layout of the electronic document 20. The updated document model DM1 is thus stored (S102) in the memory 8 of the computing device DV1. Once the document model DM1 has been updated, the method ends. In this particular example, the tree edition module 26 is deactivated (or "killed").

Other examples of implementation are however possible. Among others, alternative implementations are possible without performing for instance the steps S66 and/or S72-S74.

In the above example, the content of the current block BC1 is maintained unchanged (no resizing) while the current block BC1 is being expanded and then contracted. In a variant, the content of the current block BC1 is resized accordingly to be adapted to the size of the current block BC1. The content may be expanded (increased in size) when the current block BC1 is expanded, and vice versa.

In a particular example, the current block BC1—of which a handle HL1 is selected in S52—is a text block containing text. In this case, the input manager module 24 may perform text reflow within the current block BC1 in step S68 (FIG. 20), in the same manner as previously described with reference to FIGS. 19A-19C. The text is thus reflowed while the current block BC1 is resized. In this case for instance, the first and second handle orientations (DR3, DR4) are respectively left and right while the first and second resizing orientations (DR1, DR2) are respectively down and up, although other implementations are possible.

The first, second and third aspects of the invention thus allows for an efficient, user-friendly and adaptive management of the document layout of an electronic document.

It should be noted that, in some alternative implementations, the functions (or steps) noted in the blocks of the various block diagrams may occur out of the order noted in the figures. For example, two steps shown in succession may, in fact, be executed substantially concurrently, or the steps may sometimes be executed in the reverse order, or blocks may be executed in an alternative order, depending upon the functionality involved.

While not explicitly described, the above-described embodiments may be employed in any combination or sub-combination thereof.

This disclosure having been described in particular embodiments, it is clear that it is susceptible to numerous modifications and embodiments within the ability of those skilled in the art and without the exercise of the inventive faculty. Accordingly, the scope of the invention is defined by the scope of the following claims.

The invention claimed is:

1. A method implemented by a computing device for managing a document layout, wherein the computing device comprises a screen displaying an electronic document, a selection manager receiving a first and a second finger gestures performed with the screen, a visual feedback module, and an input manager controlling, based on the first and second finger gestures, a tree editor, wherein the method comprises:
    displaying in the electronic document at least one block containing at least one text or non-text item;
    in response to a first finger gesture of two or more fingers defining at least two selection points in the electronic document, determining a space line specifying an initial position from which a space is to be managed in said electronic document;
    in response to a second finger gesture of two or more fingers defining a movement of said at least two selected points along a first orientation comprising a vertical orientation, monitoring a current position of the space line moving over time; and
    performing a space management in the electronic document based on the current position of the space line along the first orientation, said space management comprising at least one of:
    creating a space extending from the original position to the current position of the space line;
    reducing an existing space by removing therefrom a portion extending from the original position to the current position of the space line in response to at least two selection points being positioned within the at least block, the method comprises:
    selecting, by the input manager, said block as a current block;
    determining, by the input manager, the vertical position range within which the space line can be moved within said current block, said vertical position range being limited by the top and bottom border of said current block;
    selecting, by the input manager, each item positioned below the initial position within the current block;
    displaying, by the visual feedback module, a space handle as a visual feedback representing the position of the space line over time in response to the first and second finger gestures along with a visual feedback of each selected item;
    performing, by said input manager, said space management in step a4) such that:
    if the space line is moved downwards, creating a space extending from the original position to the current position of the space line while translating downwards each selected item; and
    if the space line is moved upwards, reducing an existing space by removing therefrom a portion extending from the original position to the current position of the space line while translating upwards each selected item.

2. The method of claim 1, wherein said space management performed comprises:
    if the original position of the space line is positioned within one block, a space is created or reduced within said block so that said block is respectively expanded or contracted along the first orientation; and
    if the space line is positioned between at least two text or non-text items, a space is created or reduced so that said at least two items respectively part from each other or move closer to each other along said first orientation.

3. The method of claim 1, wherein the space management comprises:
    if the original position of the space line is positioned between two consecutive, first and second, items in the first orientation, the first item is maintained at the same position and the second item is moved along the first orientation to create or reduce a space while maintaining the block layout of the second item with any subsequent item present along the first orientation.

4. The method of claim 1, wherein said method further comprises displaying a space handle as a visual feedback representing the position of the space line over time in response to the first and second finger gestures.

5. The method of claim 1, wherein the at least two selection points detected are determined as defining said space line only if they are positioned substantially horizontally relative to each other.

6. The method of claim 1, wherein said space management comprises:
   expanding the current block if any of said each selected item reaches the bottom border of the current block by translating downwards the bottom border of the current block from an original position to a new position;
   contracting the current block if, after expanding the current block, each selected item is moved back above the original position of the bottom border of the current block.

7. The method of claim 1, wherein said at least two selection points are not positioned within a block, the method comprises:
   moving, by the input manager, the space line in the vertical orientation as a function of the second finger gesture, without limit in the downward direction; and
   displaying, by the visual feedback module, a space handle as a visual feedback representing the position of the space line over time in response to the first and second finger gestures, wherein the space handle is moved incrementally according to a pattern of discrete vertical positions in response to the movement defined by the second finger gesture.

8. The method of claim 1, wherein upon detecting an end of the second finger gesture, the method further comprises:
   removing the visual feedback of the space handle; and
   updating a document model of the electronic document to reflect the item layout achieved as a result of the space management.

* * * * *

UNITED STATES PATENT AND TRADEMARK OFFICE
CERTIFICATE OF CORRECTION

Page 1 of 1

PATENT NO. : 12,045,556 B2
APPLICATION NO. : 17/793187
DATED : July 23, 2024
INVENTOR(S) : Gregory Cousin and Baptiste Demarest It is certified that error appears in the above-identified patent and that said Letters Patent is hereby corrected as shown below:

In the Claims

Column 46, Claim 1, Lines 41 and 42, please replace "performing, by said input manager, said space management in step a4) such that:" with "performing, by said input manager, said space management such that:".

Signed and Sealed this
Twenty-fourth Day of June, 2025

Coke Morgan Stewart
*Acting Director of the United States Patent and Trademark Office*